United States Patent
Choi et al.

(10) Patent No.: US 10,732,833 B2
(45) Date of Patent: Aug. 4, 2020

(54) MOBILE TERMINAL AND METHOD FOR CONTROLLING THE SAME

(71) Applicant: LG ELECTRONICS INC., Seoul (KR)

(72) Inventors: Yoojin Choi, Seoul (KR); Huran Choi, Seoul (KR); Younhwa Choi, Seoul (KR); Sunghye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 15/600,340

(22) Filed: May 19, 2017

(65) Prior Publication Data
US 2018/0188950 A1    Jul. 5, 2018

(30) Foreign Application Priority Data

Jan. 3, 2017   (KR) .................. 10-2017-0000582

(51) Int. Cl.
*G06F 17/24*   (2006.01)
*G06F 3/0488*  (2013.01)
*G06F 3/041*   (2006.01)
*G06F 3/0354*  (2013.01)

(52) U.S. Cl.
CPC ...... *G06F 3/04886* (2013.01); *G06F 3/04883* (2013.01); *G06F 3/03547* (2013.01); *G06F 3/0412* (2013.01); *G06F 2203/04803* (2013.01)

(58) Field of Classification Search
CPC . G06F 3/04886; G06F 3/03547; G06F 3/0412
See application file for complete search history.

(56) References Cited

U.S. PATENT DOCUMENTS

| 8,248,385 B1 * | 8/2012 | Paul ...................... G06F 3/0416 345/173 |
| 9,335,924 B2 * | 5/2016 | Jobs .................. H04M 1/72552 |
| 2009/0058815 A1 * | 3/2009 | Jeon ...................... G06F 1/1613 345/169 |

(Continued)

FOREIGN PATENT DOCUMENTS

KR   1020160089265   7/2016

OTHER PUBLICATIONS

PCT International Application No. PCT/KR2017/004436, Notification of Transmittal of the International Search Report and the Written Opinion of the International Searching Authority, or Declaration dated Sep. 26, 2017, 14 pages.

*Primary Examiner* — Mohammed H Zuberi
(74) *Attorney, Agent, or Firm* — Leel Hong Degerman Kang & Waimey

(57) ABSTRACT

The present invention relates to a mobile terminal providing one hand mode for distinguishing a view area from a control area on a touch screen and a method of controlling therefor. To achieve these objects and other advantages and in accordance with the purpose of the invention, according to one embodiment, a mobile terminal includes a touch screen, and a controller configured to enter one hand mode that divides the touch screen into a view area and a control area in response to a first control input inputted on the touch screen, the controller, if the mobile terminal enters the one hand mode in a state that a default keypad is outputted on the touch screen, configured to control a simple keypad to be outputted on the control area instead of the default keypad.

19 Claims, 19 Drawing Sheets

(56) References Cited

U.S. PATENT DOCUMENTS

| | | | |
|---|---|---|---|
| 2011/0167375 A1* | 7/2011 | Kocienda | G06F 1/3203 |
| | | | 715/773 |
| 2011/0202835 A1 | 8/2011 | Jakobsson et al. | |
| 2012/0113007 A1* | 5/2012 | Koch | G06F 3/0488 |
| | | | 345/168 |
| 2012/0117506 A1* | 5/2012 | Koch | G06F 3/04886 |
| | | | 715/773 |
| 2013/0278565 A1* | 10/2013 | Park | G06F 3/0418 |
| | | | 345/178 |
| 2014/0098024 A1* | 4/2014 | Paek | G06F 3/04886 |
| | | | 345/168 |
| 2014/0152593 A1 | 6/2014 | Wu et al. | |
| 2014/0351761 A1 | 11/2014 | Bae et al. | |
| 2015/0067614 A1* | 3/2015 | Jong | G06F 3/04883 |
| | | | 715/863 |
| 2015/0082230 A1 | 3/2015 | Lee et al. | |
| 2015/0363008 A1* | 12/2015 | VanBlon | G06F 1/1686 |
| | | | 345/158 |
| 2015/0365306 A1* | 12/2015 | Chaudhri | G06F 3/0416 |
| | | | 715/736 |
| 2016/0349856 A1* | 12/2016 | Chi | G06F 3/0238 |
| 2017/0075701 A1* | 3/2017 | Ricci | G06F 16/252 |
| 2017/0076502 A1* | 3/2017 | Chen | G06K 9/00362 |
| 2017/0336926 A1* | 11/2017 | Chaudhri | G06F 40/197 |
| 2017/0336960 A1* | 11/2017 | Chaudhri | G06F 3/04817 |
| 2019/0369870 A1* | 12/2019 | Marsden | G06F 3/016 |

\* cited by examiner

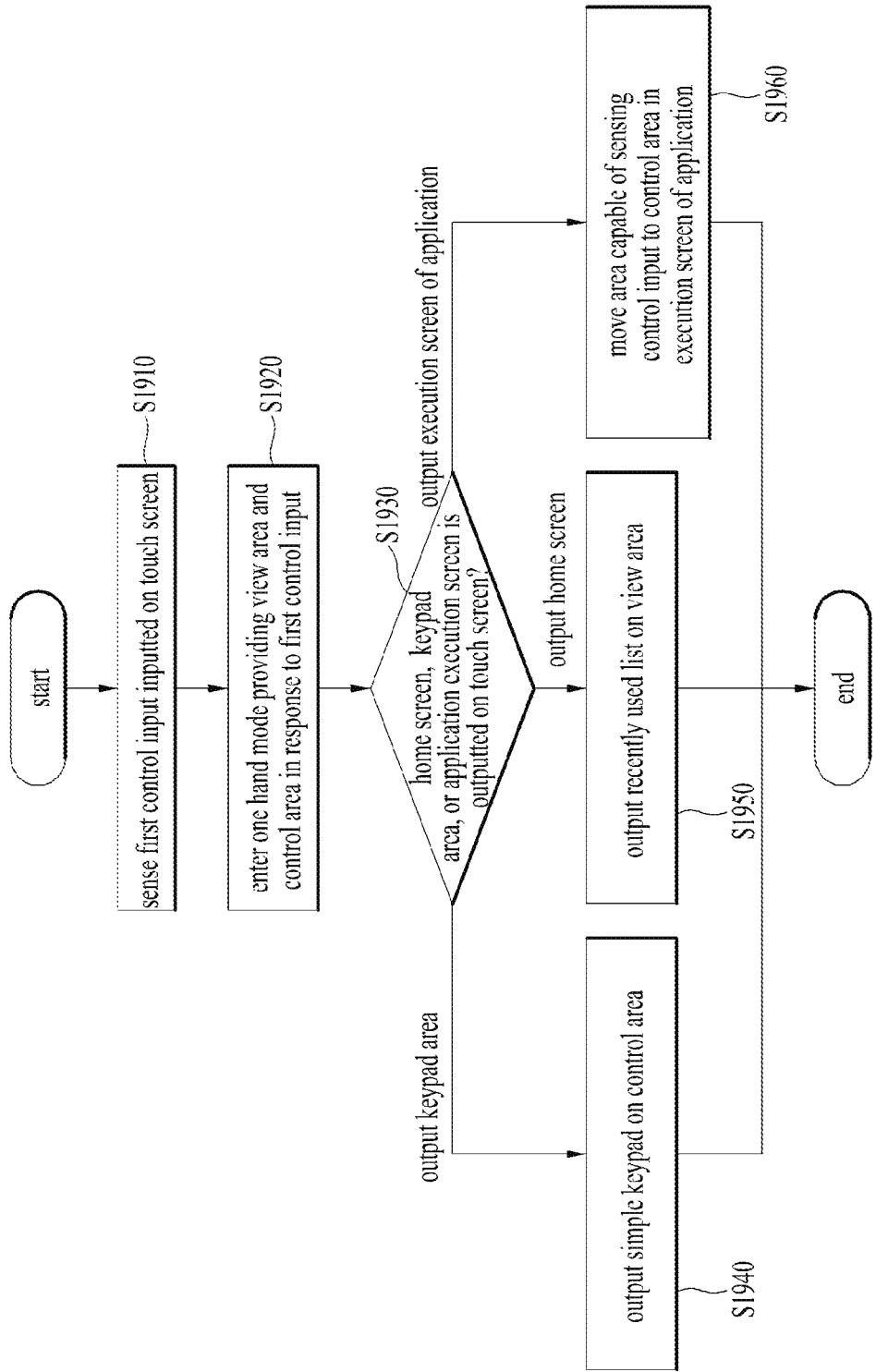

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2017-0000582, filed on Jan. 3, 2017, the contents of which are hereby incorporated by reference herein in their entirety.

BACKGROUND OF THE INVENTION

Field of the Invention

The present invention relates to a mobile terminal providing one hand mode for distinguishing a view area from a control area on a touch screen and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, a mobile terminal can be operated by two hands or one hand depending on a size of a display unit of the mobile terminal and a size of a hand of a user. In this case, if the mobile terminal is operated by one hand, it may be difficult for a hand size of a user to operate the whole of the display unit. In this case, an area capable of being operated by a hand of the user can be restricted to a bottom part of the display unit. Hence, it may output a screen to the area capable of being operated by one hand of the user only by reducing a size of the screen. In this case, since the screen is outputted to a partial area only of the whole of the display unit, it may be required to have a method capable of utilizing the remaining empty area together.

SUMMARY OF THE INVENTION

Accordingly, an object of the present invention is to address the above-noted and other problems. Another object of the present invention is to provide a mobile terminal enabling a user to utilize the whole of a touch screen in one hand mode and a method of controlling therefor.

The other object of the present invention is to provide a mobile terminal enabling a user to control a view area on a control area in a manner of distinctively providing the view area and the control area in one hand mode and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a touch screen and a controller configured to enter one hand mode that divides the touch screen into a view area and a control area in response to a first control input inputted on the touch screen, the controller, if the mobile terminal enters the one hand mode in a state that a default keypad is outputted on the touch screen, configured to control a simple keypad to be outputted on the control area instead of the default keypad.

According to a different embodiment of the present invention, the controller can output a view area pop-up window on the control area in response to a second control input inputted on the control area.

According to a further different embodiment of the present invention, if a control input is not sensed during predetermine time in a state that the view area pop-up window is outputted on the control area, the controller can eliminate the view area pop-up window.

According to a further different embodiment of the present invention, if the mobile terminal enters the one hand mode in the state that the default keypad is outputted on the touch screen, the controller can output a conversation information area of a message application on the control area.

According to a further different embodiment of the present invention, if the mobile terminal enters the one hand mode in a state that a home screen is outputted on the touch screen, the controller can output the home screen on the control area and control a list of recently used applications to be outputted on the view area.

According to a further different embodiment of the present invention, if a third control input inputted on the control area is sensed and the second control input corresponds to a touch and drag input released at a bezel area of the touch screen, the controller can output an execution screen of a most recently used application among the list of recently used applications.

According to a further different embodiment of the present invention, if the mobile terminal enters the one hand mode in a state that an execution screen of an application is outputted on the touch screen, the controller can output an editing area among the execution screen of the application on the control area.

According to a further different embodiment of the present invention, the controller can output a normal area except the editing area among the execution screen of the application on the view area and the control area and a magnified view of the normal area is outputted on the view area.

According to a further different embodiment of the present invention, the controller can control not only the normal area outputted on the control area but also the normal area outputted on the view area in response to a fourth control input inputted on the normal area which is outputted on the control area.

According to a further different embodiment of the present invention, the first control input may correspond to a press touch and drag input in one direction.

According to a further different embodiment of the present invention, if a second control input is sensed in the one hand mode, the controller can terminate the one hand mode and switch the mobile terminal into a normal mode and the second control input may correspond to a press touch and drag input in a different direction.

According to a further different embodiment of the present invention, the view area may correspond to an area at which a control input is not sensed and the control area may correspond to an area at which a control input is sensed.

According to a further different embodiment of the present invention, the first control input can be sensed on a blank area of the touch screen.

According to a further different embodiment of the present invention, if the mobile terminal enters the one hand mode, the controller can output a division indicator between the view area and the control area.

According to a further different embodiment of the present invention, the mobile terminal can further include a wireless communication unit. In this case, if an event is received, the controller can output a notification for the received event at the top of the touch screen and output the view area and the control area in a manner of moving the view area and the control area to the bottom as much as a size of the notification.

To further achieve these objects and other advantages and in accordance with the purpose of the invention, as embodied and broadly described herein, according to a different embodiment, a method of controlling a mobile terminal, includes the steps of sensing a first control input inputted on a touch screen and entering one hand mode that divides the touch screen into a view area and a control area in response to the first control input. In this case, if the mobile terminal enters the one hand mode in a state that a default keypad is outputted on the touch screen, the step of entering the one hand mode can further include the step of outputting a simple keypad on the control area instead of the default keypad.

According to a different embodiment of the present invention, if the mobile terminal enters the one hand mode in a state that a home screen is outputted on the touch screen, the step of entering the one hand mode can further include the step of outputting the home screen on the control area and outputting a recently used list on the view area.

According to a further different embodiment of the present invention, if the mobile terminal enters the one hand mode in a state that an execution screen of an application is outputted on the touch screen, the step of entering the one hand mode can further include the step of outputting an editing area among the execution screen of the application on the control area.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 19 is a flowchart for a method of controlling a mobile terminal according to one embodiment of the present invention.

DETAILED DESCRIPTION OF THE INVENTION

Figure 1A:
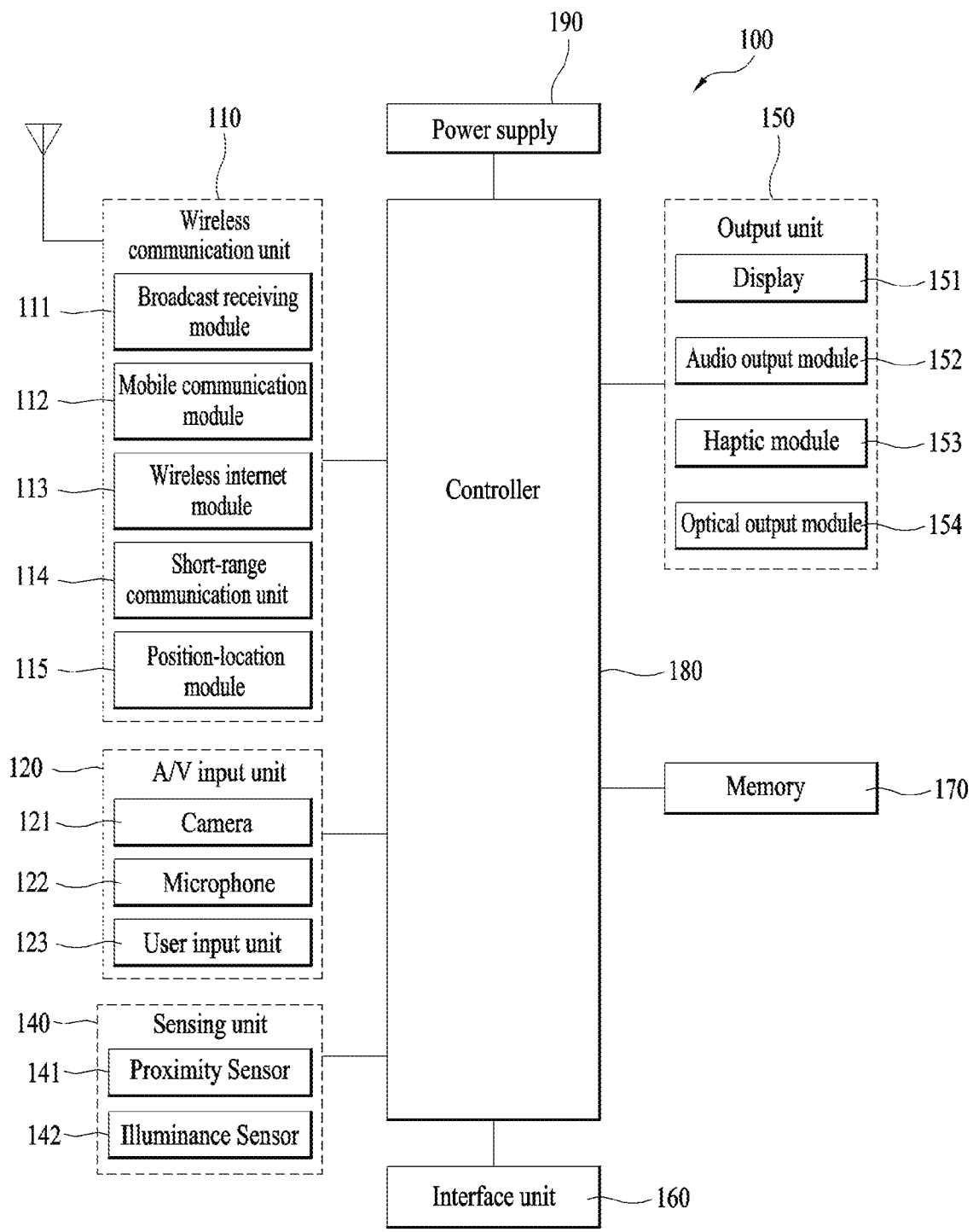
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

[[US Only Start]]

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

[[US Only End]]

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
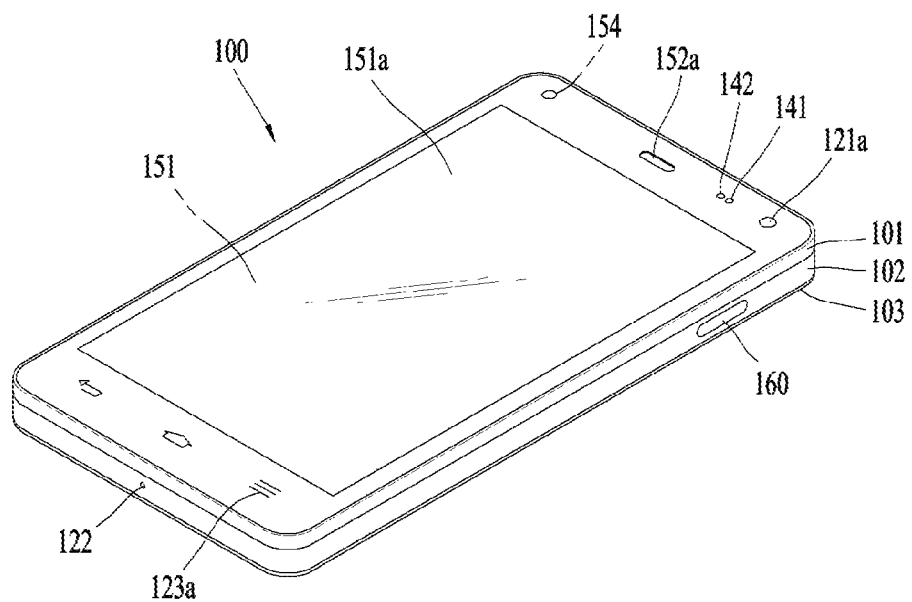
FIGS. 1B and 1C are conceptual views of one example of the mobile terminal, viewed from different directions.
Figure 1C:
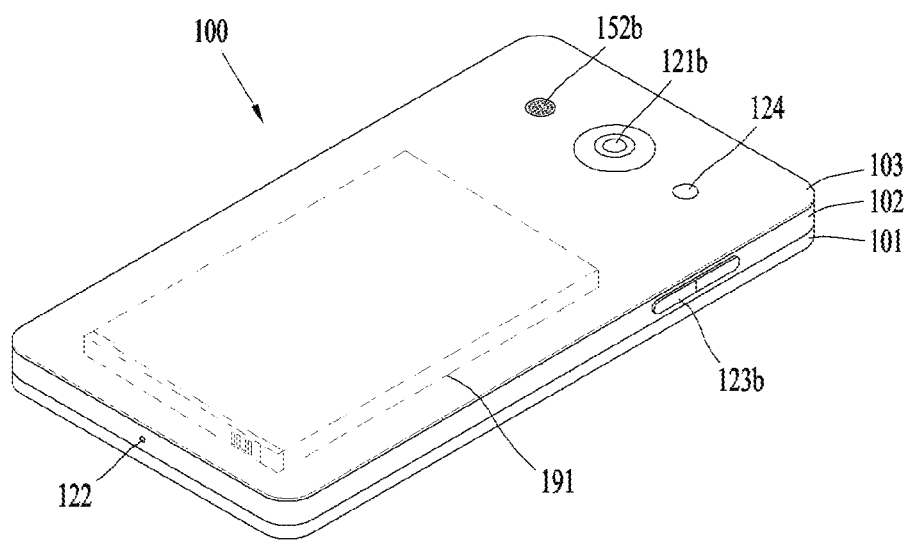

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the configuration elements can operate in a manner of cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

[[UX Part Start]]

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

[[Broadcast Start]

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

[[Broadcast End]]

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

[[3D Start]]

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

[[3D End]]

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

[[UX Part End]]
[[Apparatus Part Start]]

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152a/152b, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
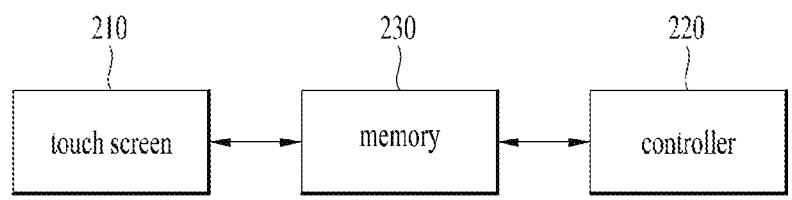
FIG. 2 is a block diagram for a mobile terminal according to one embodiment of the present invention.

FIG. 2 is a block diagram for a mobile terminal according to one embodiment of the present invention.

According to one embodiment of the present invention, a mobile terminal can include a touch screen 210, a memory 220, and a controller 230. Although it is not depicted in FIG. 2, the mobile terminal can further include a wireless communication unit. And, a configuration module installed in the mobile terminal is not restricted by the aforementioned modules and may further include various configuration modules. Meanwhile, although it is explained as a device for which the present invention is implemented corresponds to a mobile terminal, by which the present invention may be non-limited. In particular, the present invention can be applied to various display devices including a touch screen. And, the device for which the present invention is implemented can include a display device capable of being handled by one hand.

The touch screen 210 can display visual information. In this case, the visual information can include content, an application, an image, a video, an icon, and the like. And, the touch screen 210 can display information processed in the mobile terminal. For example, the touch screen 210 may be able to display UI (user interface) and GUI (graphic user interface) according to information on an execution screen of an application program executed in the mobile terminal. And, the touch screen 210 can output the visual information on a screen based on a control command of the controller 230.

In the present invention, the touch screen 210 can be implemented by the display unit 151 shown in FIG. 1a together with the sensing unit 140 or the input unit 120.

According to one embodiment of the present invention, in case of entering one hand mode, the touch screen 210 can provide a view area and a control area.

The memory 220 can store data related to operations performed in the mobile terminal. For example, the memory 220 can include not only a storing medium installed in the mobile terminal but also a storing medium installed in the exterior of the mobile terminal. For example, the storing medium installed in the exterior of the mobile terminal can include an external hard, cloud, and the like. In the present invention, the memory 220 can be implemented by the memory 170 of FIG. 1a. According to one embodiment of the present invention, the memory 220 can store images.

The controller 230 processes data, controls the aforementioned units of the mobile terminal, and controls data transmission/reception between units. In the present invention, the controller 230 can be implemented by the controller 180 of FIG. 1a. According to one embodiment of the present invention, the controller 230 can provide a view area and a control area by dividing a touch screen into the view area and the control area in response to a control input.

As one embodiment of the present invention, operations performed by the mobile terminal can be controlled by the controller 230. Yet, for clarity, it is explained as the operations are commonly performed by the mobile terminal in the drawings and the description described in the following. In the following, a method of providing a view area and a control area in one hand mode of a mobile terminal is explained with reference to embodiments of FIGS. 3 to 19.

Figure 3:
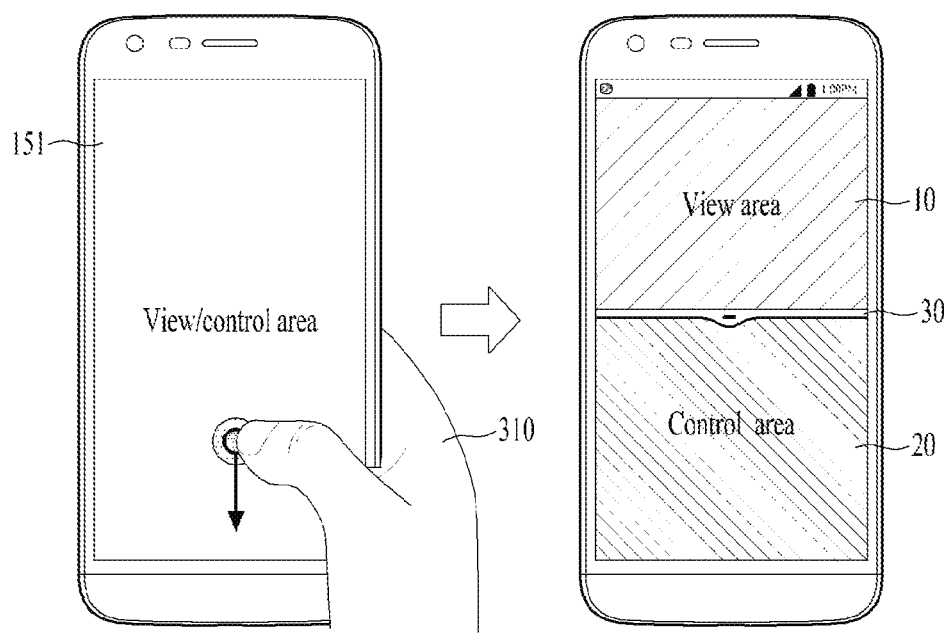
FIG. 3 is a diagram for an example of entering one hand mode in a mobile terminal according to one embodiment of the present invention.

FIG. 3 is a diagram for an example of entering one hand mode in a mobile terminal according to one embodiment of the present invention.

A mobile terminal can be operated by two hands or one hand of a user depending on a size of a touch screen and a hand size of the user. In this case, when the mobile terminal is operated by one hand, it may be difficult to operate the whole screen of the touch screen by the hand size of the user. For example, if it is not sufficient enough for the hand size of the user to operate the mobile terminal by one hand, the user may operate the bottom part of the mobile terminal only. In this case, it is necessary for the user to have a method capable of operating the whole of the mobile terminal by one hand.

Referring to the first drawing of FIG. 3, the mobile terminal can provide the whole of a touch screen 151 as a view and a control area in a normal mode. In this case, the view and the control area correspond to areas capable of outputting contents and sensing such a control input as a touch input on the touch screen at the same time.

In this case, the mobile terminal can sense a control input 310 inputted on the touch screen. In this case, the control input 310 may correspond to a press touch and drag input. For example, the control input 310 may correspond to a touch input touching the touch screen 151 with pressure equal to or greater than a predetermined strength and moving the touch in one direction. The strength of the touch input moving in one direction may exceed the predetermined strength or may not exceed the predetermined strength. In the present invention, assume that one direction corresponds to down direction.

Meanwhile, although it is not depicted in FIG. 3, if an input inputted in a direction opposite to the direction of the control input 310 is sensed in one hand mode, the mobile terminal may switch to a normal mode from the one hand mode. For example, if a touch input pressing the touch screen and dragging the touch in up direction is sensed in the one hand mode, the mobile terminal can switch to the normal mode from the one hand mode.

In this case, the mobile terminal can switch to the one hand mode from the normal mode in response to the control input 310. More specifically, as shown in the second drawing of FIG. 3, the mobile terminal can provide the touch screen in a manner of dividing the touch screen into a view area 10 and a control area 20. In this case, the view area 10 corresponds to an area where a control input is deactivated on the touch screen and the area where a function of outputting contents is provided only. And, the control area 20 corresponds to an area where a control input is activated on the touch screen and the area capable of outputting contents and sensing a control input at the same time.

According to an embodiment of FIG. 3, in case of entering one hand mode, the touch screen 151 is divided in half to provide the view area 101 and the control area 20, by which the present invention may be non-limited. In particular, a ratio of occupying the touch screen respectively occupied by the view area 10 and the control area 20 can be differently configured depending on a size of the touch screen of the mobile terminal.

Referring to the second drawing of FIG. 3, in case of switching to the one hand mode, the mobile terminal divides the touch screen into the view area 10 and the control area 20 and can output a division indicator 30 in the form of a bar to control sizes of the view area 10 and the control area 20. In the following embodiments, in case of entering the one hand mode, assume that a division indicator area exists between the view area 10 and the control area 20.

In case of switching to the one hand mode, a user can control the touch screen by one hand irrespective of a size of the touch screen. Regarding this, it shall be explained in detail with reference to FIGS. 4 to 11.

Entering One Hand Mode in State that Keypad is Outputted

Figure 4:
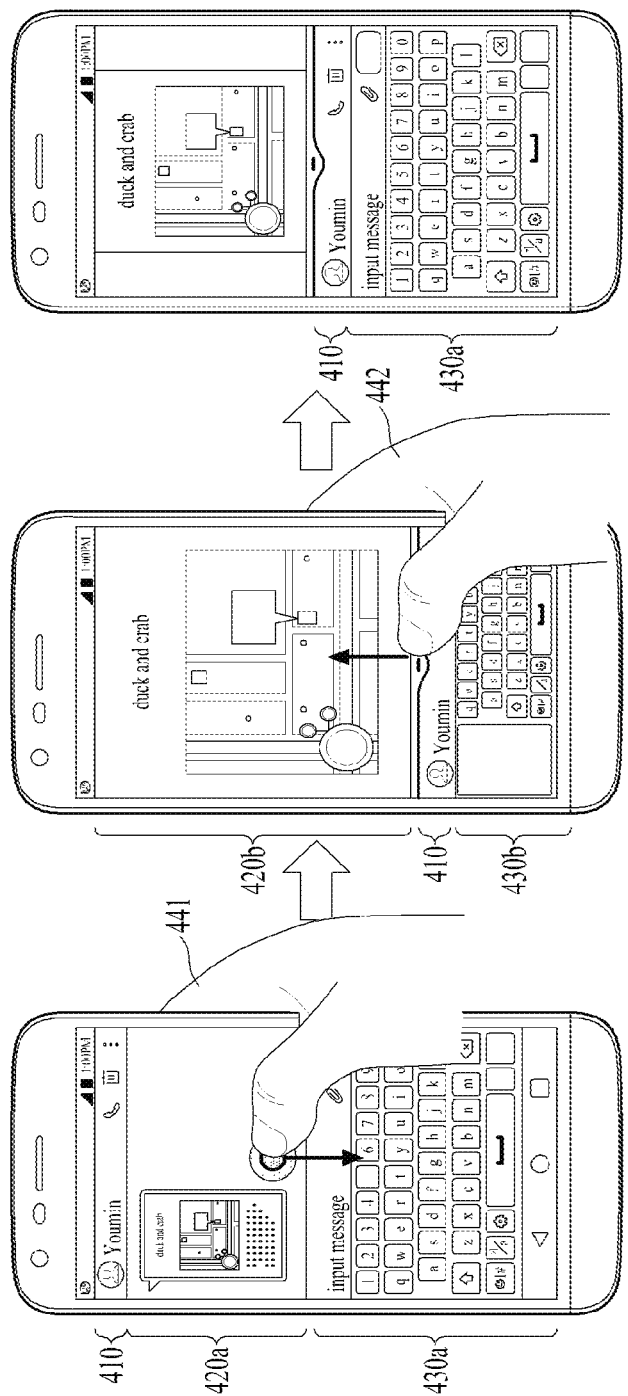
FIG. 4 is a diagram for an example of entering one hand mode in a state that a keypad is outputted in a mobile terminal according to one embodiment of the present invention.

FIG. 4 is a diagram for an example of entering one hand mode in a state that a keypad is outputted in a mobile terminal according to one embodiment of the present invention. In the embodiment of FIG. 4, explanation on contents overlapped with FIG. 3 is omitted.

Referring to the first drawing of FIG. 4, an execution screen of a message application is outputted on the touch screen. In this case, the execution screen of the message application can include conversation information 410, conversation contents 420a, and a keypad 430a. In this case, the conversation information 410 can include a name of a conversation partner, a terminal number of the conversation partner, and a control menu. The conversation contents 420a can include a message received from the terminal of the conversation partner and a message sent from the mobile terminal in chronological order. The conversation information 410 and the conversation contents 420a can be commonly referred to as a conversation window. The keypad 430a corresponds to a keyboard for inputting a message and may correspond to a default keyboard basically provided by the message application.

In this case, the mobile terminal can sense a first control input 441 inputted on the touch screen. The first control input 441 corresponds to an input identical to the control input mentioned earlier in FIG. 3. The first control input 441 can be sensed on a blank area of the touch screen. In this case, although a touch input is sensed in a state that content is outputted on the touch screen, no function is executed on the blank area. For example, the blank area corresponds to an area at which the keypad, a message, and the like are not outputted.

Subsequently, the mobile terminal can switch to one hand mode from a normal mode in response to the first control input 441. If the mobile terminal switches to the one hand mode in a state that a default keypad 430a is outputted, the mobile terminal can output conversation information 410 and a keypad on the control area. In this case, the mobile terminal can output a simple keypad 430b on the control area instead of the default keypad 430a. The simple keypad 430b corresponds to a keypad including minimum input keys only, while numbers and special characters are excluded from the default keypad 430a. If the mobile terminal switches to the one hand mode, the conversation contents 420a can be outputted in a manner of being magnified.

In this case, it may be able to output input keys to the left or right side according to a grip state of the mobile terminal. For example, if it is recognized as the mobile terminal is gripped by a right hand, the mobile terminal can control the input keys to be outputted to the right side. Meanwhile, although it is depicted as English keypad is outputted in the embodiment of FIG. 4, it is apparent that it is able to output Korean keypad as well. If a flicking touch in left direction or right direction is sensed in a state that the English keypad is outputted, a different keypad can be outputted in manner of being changed from the English keypad.

The mobile terminal can output a division indicator to indicate that the mobile terminal is switched to one hand mode. Referring to the second drawing of FIG. 4, the mobile terminal can sense a second control input 442 inputted on the division indicator. In this case, unlike the first control input 441, the second control input 442 may correspond to a touch and drag input touched by normal touch strength. And, a position at which the second control input 442 is sensed can include not a precise position of the division indicator but an area adjacent to the division indicator. In this case, the mobile terminal can control sizes of the view area and the control area according to a moving distance of the second control input 442.

In this case, if the size of the control area exceeds a prescribed size according to the second control input 442, the mobile terminal can output the default keypad 430a again on the control area. As the size of the control area increases, the size of the view area may decrease.

Figure 5:
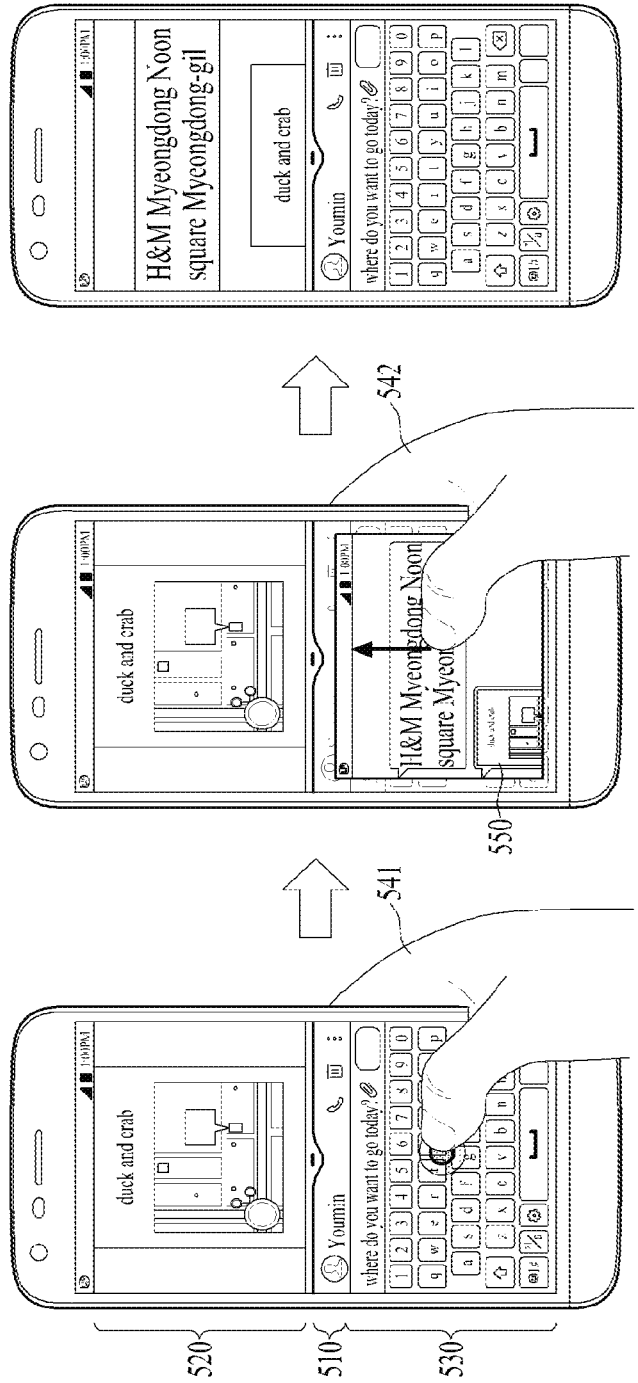
FIG. 5 is a diagram for a different example of entering one hand mode in a state that a keypad is outputted in a mobile terminal according to one embodiment of the present invention.

FIG. 5 is a diagram for a different example of entering one hand mode in a state that a keypad is outputted in a mobile terminal according to one embodiment of the present invention.

More specifically, FIG. 5 shows a method of controlling a view area through a control area in one hand mode. In an embodiment of FIG. 5, explanation on contents overlapped with the contents of FIGS. 3 and 4 is omitted.

Referring to the first drawing of FIG. 5, it shows a screen entered in one hand mode in a state that an execution screen of a message application is outputted. In particular, conversation content 520 is assigned to the view area and conversation information 510 and a keypad 530 are assigned to the control area. In this case, the mobile terminal can sense a first control input 541. In this case, the control input may correspond to a long press touch input.

In this case, as shown in the second drawing of FIG. 5, the mobile terminal can output a view area pop-up window 550 on the control area in a manner of overlaying the control area with the pop-up window. More specifically, the mobile terminal can output the view area pop-up window 550 in a state that the conversation information 510 and the keypad 530 are outputted on the control area. In this case, the view area pop-up window 550 corresponds to a pop-up including the contents currently outputted on the view area by reducing a size of the contents.

The mobile terminal can sense a second control input 542 in a state that the view area pop-up window 550 is outputted on the control area. For example, the second control input 542 may correspond to a drag touch or a flicking touch in one direction. In this case, the mobile terminal can scroll the contents outputted on the view area pop-up window 550 in response to the second control input 542. And, it may also be able to scroll the contents outputted on the view area in response to the scrolling of the view area pop-up window 550.

If no control input is sensed during predetermined time, the mobile terminal can eliminate the view area pop-up window 550 from the control area. More specifically, referring to the third drawing of FIG. 5, if a control input is not sensed for more than predetermined time, the mobile terminal eliminates the view area pop-up window 550 from the control area and it may be able to activate sensing of a control input inputted on the conversation information 510 and the keypad 530.

In particular, according to the aforementioned embodiment, although it is impossible to directly input a control input to the view area, it may be able to easily control the view area through the control area. Meanwhile, unlike the embodiment of FIG. 5, if the first control input 441 corresponds to a normal touch input rather than press touch input, it may be able to input a text in response to the first control input 441.

Entering One Hand Mode in State that Home Screen is Outputted

Figure 6:
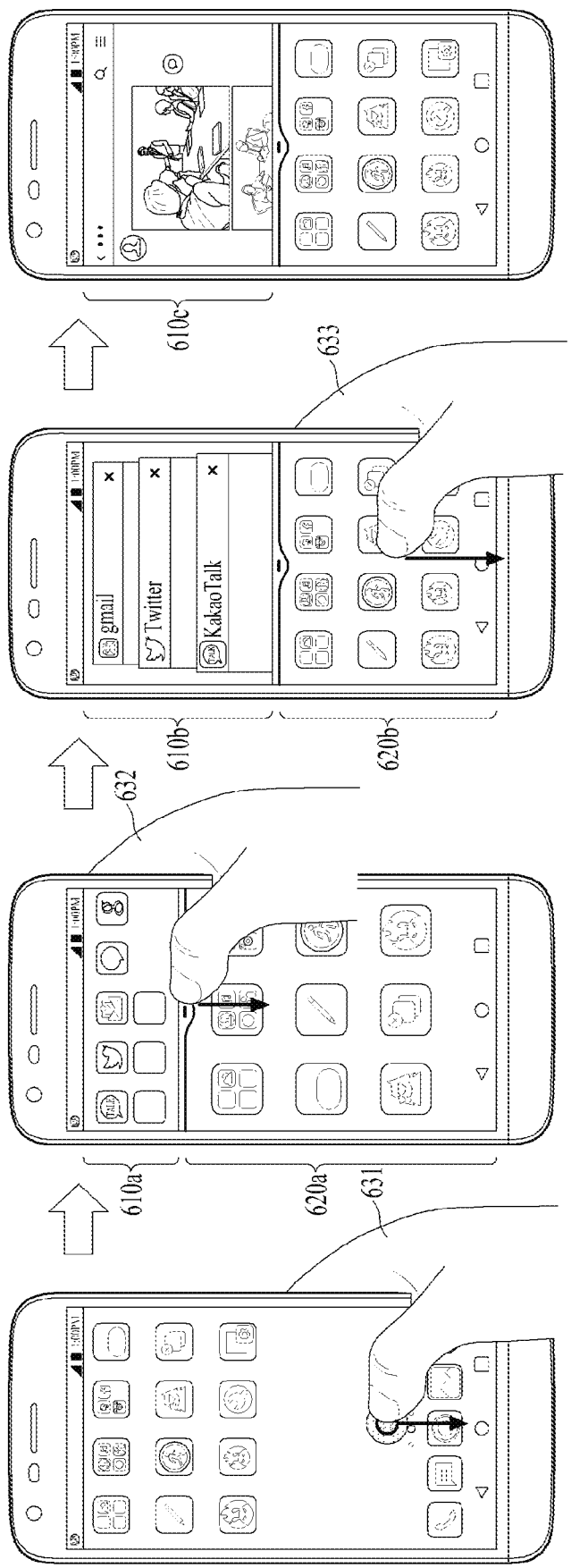
FIG. 6 is a diagram for an example of entering one hand mode in a state that a home screen is outputted in a mobile terminal according to one embodiment of the present invention.

FIG. 6 is a diagram for an example of entering one hand mode in a state that a home screen is outputted in a mobile terminal according to one embodiment of the present invention. In the embodiment of FIG. 6, explanation on contents overlapped with the contents of FIG. 3 is omitted.

Referring to the first drawing of FIG. 6, a home screen is outputted on a touch screen. In this case, the mobile terminal can sense a first control input 631 inputted on the touch screen. In this case, the first control input 631 corresponds to an input identical to the control input mentioned earlier in FIG. 3. It may be able to sense the first control input 631 on a blank area including neither an icon nor an execution button of the home screen of the touch screen.

Subsequently, the mobile terminal can switch to one hand mode from a normal mode in response to the first control input 631. More specifically, the mobile terminal can switch to the one hand mode including a view area and a control area, which are respectively located at the top and the bottom, in response to the first control input 631.

If the mobile terminal is switched to the one hand mode in a state that the home screen is outputted, the mobile terminal outputs a list of recently used applications on the view area and outputs the home screen on the control area. A form of outputting the list of recently used applications and the home screen may change based on sizes of the view area and the control area. Referring to the second drawing of FIG. 6, if the size of the view area is smaller than a half of the touch screen size (e.g., ⅓), the mobile terminal can output the list 610a of recently used applications on the view area in the form of icons. If the size of the view area is greater than a half of the touch screen size, the mobile terminal can output a home screen 620a that 3 icons are assigned in a row.

The mobile terminal can output a division indicator to inform a user that the mobile terminal is switched to one hand mode and to control the sizes of the view area and the control area. Referring to the second drawing of FIG. 6, the mobile terminal can sense a second control input 632 inputted on the division indicator. In this case, unlike the first control input 631, the second control input may correspond to a touch and drag input of normal touch strength. And, a position at which the second control input 632 is sensed can include the division indicator and an area adjacent to the division indicator. In this case, the mobile terminal can control the sizes of the view area and the control area according to a moving distance of the second control input 632.

If the size of the view area belongs to a range of a prescribed size according to the second control input 632, the mobile terminal can output a list 610b of recently used applications in a manner of vertically listing each of execution screens of a plurality of the recently used applications on the view area in the form of windows. In particular, if the size of the view area increases, the mobile terminal provides a user with the list 610b of recently used applications including a part of execution screens of actual applications. By doing so, the user can easily recognize the recently used applications. In this case, the prescribed size may correspond to a half of the touch screen size. In this case, the mobile terminal can output a home screen 620b that 4 icons are assigned in a row on the control area by changing a layout. By doing so, it is able to increase the number of icons capable of being recognized at a time without scrolling when the size of the control is getting smaller.

Meanwhile, the mobile terminal can sense a third control input 633 in a state that a list of recently used applications is outputted on the view area and a home screen is outputted on the control area. In this case, the third control input 633 may correspond to a touch and drag input identical to the second control input 632. The third control input 633 can be sensed at any position of the control area. In this case, the third control input 633 may correspond to a touch and drag input in down direction and the third control input can be released at a bezel area of the touch screen.

In this case, referring to the fourth drawing of FIG. 6, the mobile terminal can output an execution screen 610c of a most recently used application among a list of recently used applications on the view area in response to the third control input 633.

Figure 7:
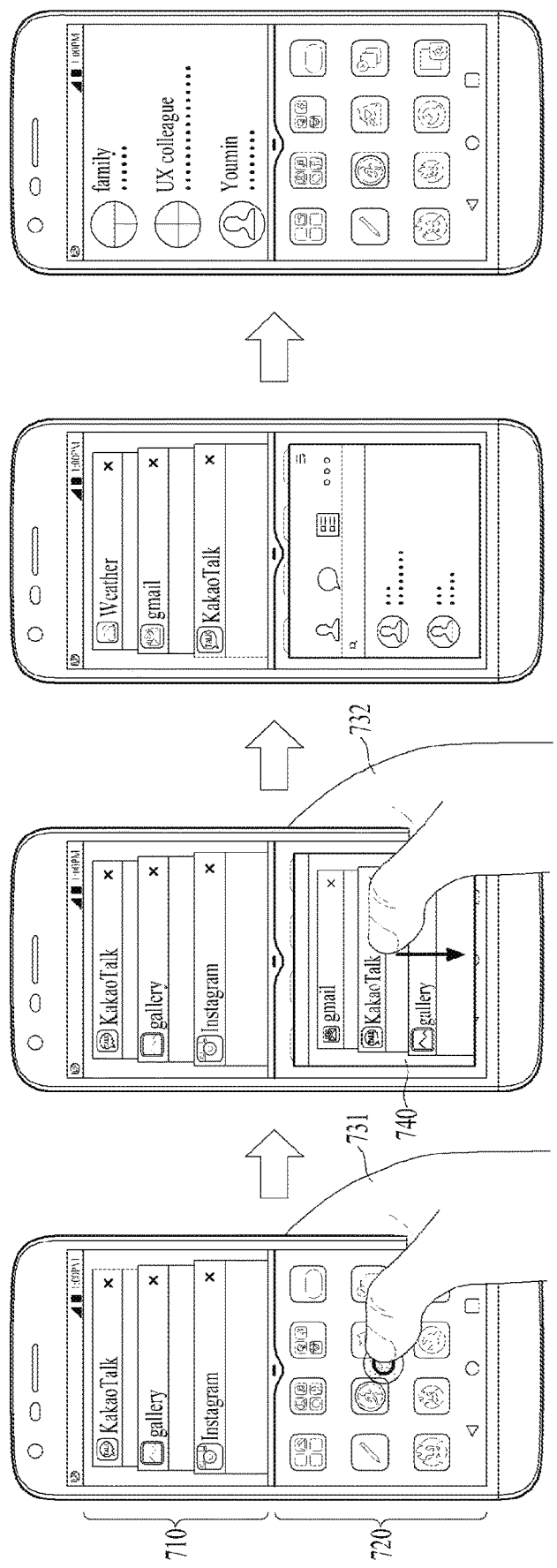
FIG. 7 is a diagram for a different example of entering one hand mode in a state that a home screen is outputted in a mobile terminal according to one embodiment of the present invention.

FIG. 7 is a diagram for a different example of entering one hand mode in a state that a home screen is outputted in a mobile terminal according to one embodiment of the present invention.

More specifically, FIG. 7 shows a method of controlling the view area through the control area in one hand mode. In an embodiment of FIG. 7, explanation on contents overlapped with the contents of FIGS. 3 to 6 is omitted.

Referring to the first drawing of FIG. 7, it shows a screen entered in one hand mode in a state that a home screen is outputted. In particular, as mentioned earlier in FIG. 6, a list 710 of recently used applications is outputted on the view area and a home screen 720 is outputted on the control area. In this case, the mobile terminal can sense a first control input 731. In this case, the first control input 731 may correspond to a long press touch input.

In this case, as shown in the second drawing of FIG. 7, the mobile terminal can output a view area pop-up window 740 on the control area in a manner of overlaying the control area with the pop-up window. More specifically, the mobile terminal can output the view area pop-up window 740 in a state that a home screen is outputted on the control area. In this case, the view area pop-up window 740 corresponds to a pop-up including the contents currently outputted on the view area by reducing a size of the contents.

The mobile terminal can sense a second control input 732 in a state that the view area pop-up window 740 is outputted on the control area. For example, the second control input 732 may correspond to a drag touch or a flicking touch in one direction. In this case, the mobile terminal can scroll the contents outputted on the view area pop-up window 740 in response to the second control input 732. According to the embodiment of FIG. 7, when a gallery application is outputted at the top among a list of recently used applications, it may be able to control a message application to be outputted at the top in response to the second control input 732.

In this case, as shown in the third drawing of FIG. 7, it may also be able to control the message application to be outputted at the top among a list of recently used applications outputted on the view area in response to the scrolling of the view area pop-up window 740. Although it is not depicted in FIG. 7, the mobile terminal can sense a control input (not depicted) for selecting the message application outputted on the view area pop-up window 740. The mobile terminal can control an execution screen of the message application to be outputted on the view area among the list 710 of recently used applications. The mobile terminal can output a conversation list only on the view area except conversation information corresponding to a control target.

If no control input is sensed during predetermined time, the mobile terminal can eliminate the view area pop-up window 740 from the control area. More specifically, referring to the fourth drawing of FIG. 7, if a control input is not sensed for more than predetermined time, the mobile terminal eliminates the view area pop-up window 740 from the control area and may be able to activate sensing of a control input inputted on the home screen.

In particular, according to the aforementioned embodiment, although it is impossible to input a control input to the view area in one hand mode, it may be able to indirectly control the view area through the control area.

Figure 8:
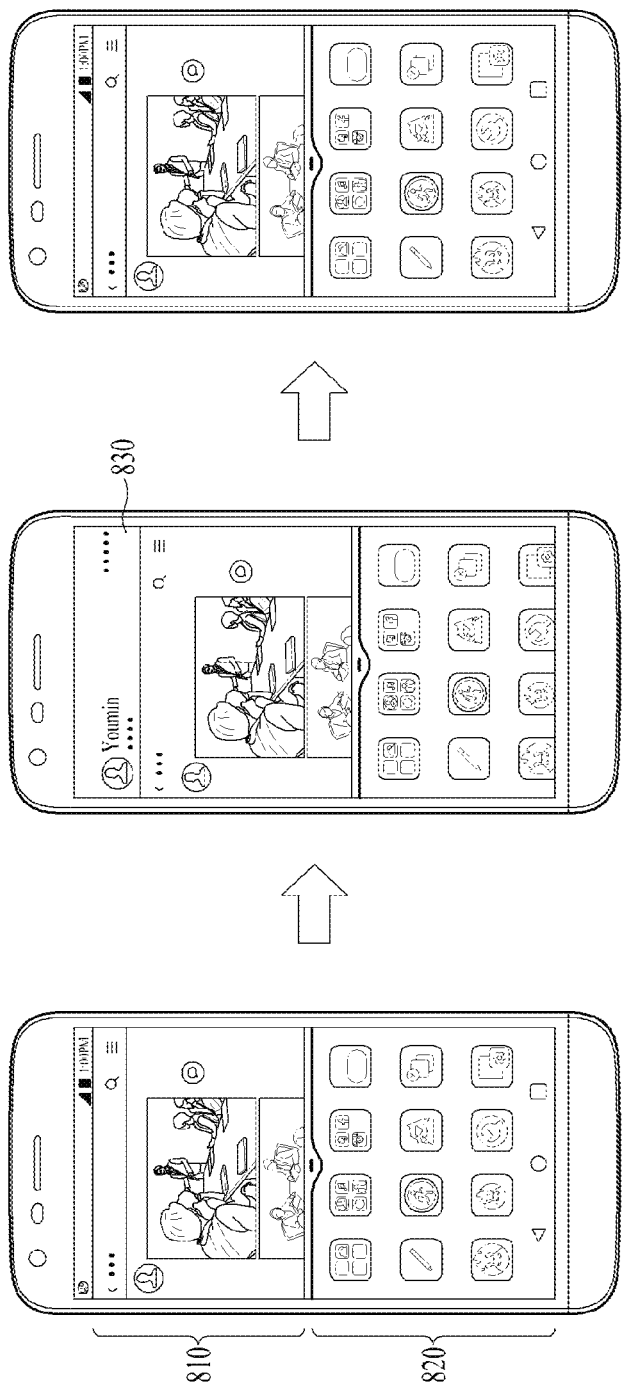
FIG. 8 is a diagram for a further different example of entering one hand mode in a state that a home screen is outputted in a mobile terminal according to one embodiment of the present invention.

FIG. 8 is a diagram for a further different example of entering one hand mode in a state that a home screen is outputted in a mobile terminal according to one embodiment of the present invention.

More specifically, FIG. 8 shows a method of outputting a notification for event reception in one hand mode. In an embodiment of FIG. 8, explanation on contents overlapped with the contents of FIGS. 3 to 7 is omitted.

Referring to the first drawing of FIG. 8, it shows a screen entered the one hand mode in a state that a home screen is outputted. A conversation window 810 of a message application, which is selected from a list of recently used applications, is outputted on the view area and a home screen 820 is outputted on the control area. Unlike the contents of the embodiment of FIG. 4 that conversation information is outputted only on the view area, according to the embodiment of FIG. 8, both conversation information and conversation content included in the conversation window are outputted on the view area. This is because the contents, which are outputted on the view area and the control area, are not outputted based on the same application. Depending on a configuration, similar to the embodiment of FIG. 4, it may separately output the conversation information and the conversation content.

Meanwhile, the mobile terminal can receive an event in one hand mode. In this case, the received event can include an event generated in the mobile terminal itself and an event received from the external. For example, the received event includes phone call reception, message reception alarm generation, e-mail reception, application notification generation, and the like, by which the present invention may be non-limited. In the embodiment of FIG. 8, the received event corresponds to message reception. In this case, as shown in the second drawing of FIG. 8, the mobile terminal can output a notification 830 for the received event at the top of the touch screen. In relation to this, the mobile terminal can temporarily move the view area and the control area to the bottom as much as a size of the notification 830 to output the notification 830. Hence, although the view area is outputted as it is in a state that the view area and the control area are moved to the bottom, a part of the control area may not be outputted.

Referring to the third drawing of FIG. 8, if prescribed time elapses after the notification 830 is outputted, the mobile terminal removes the notification 830 and may be then able to restore the control area and the view area.

Entering One Hand Mode while Executing Application

Figure 9:
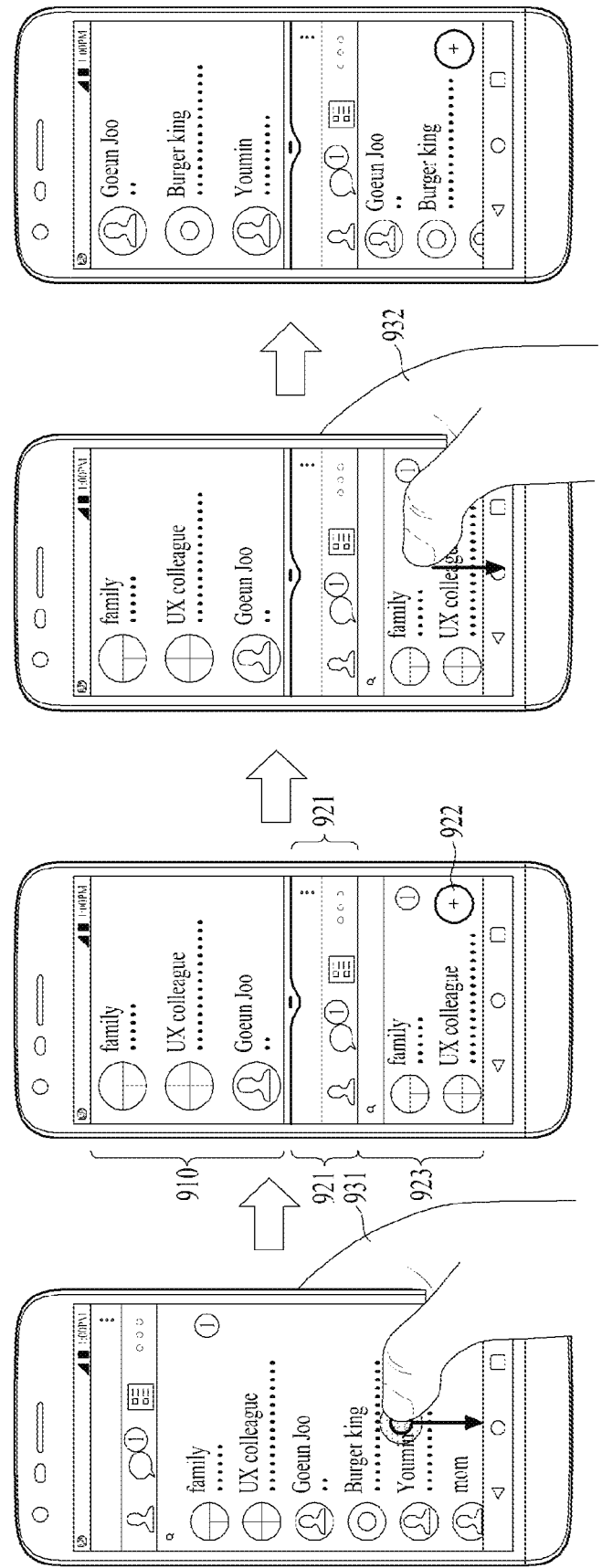
FIG. 9 is a diagram for an example of entering one hand mode in the middle of executing an application in a mobile terminal according to one embodiment of the present invention.
Figure 10:
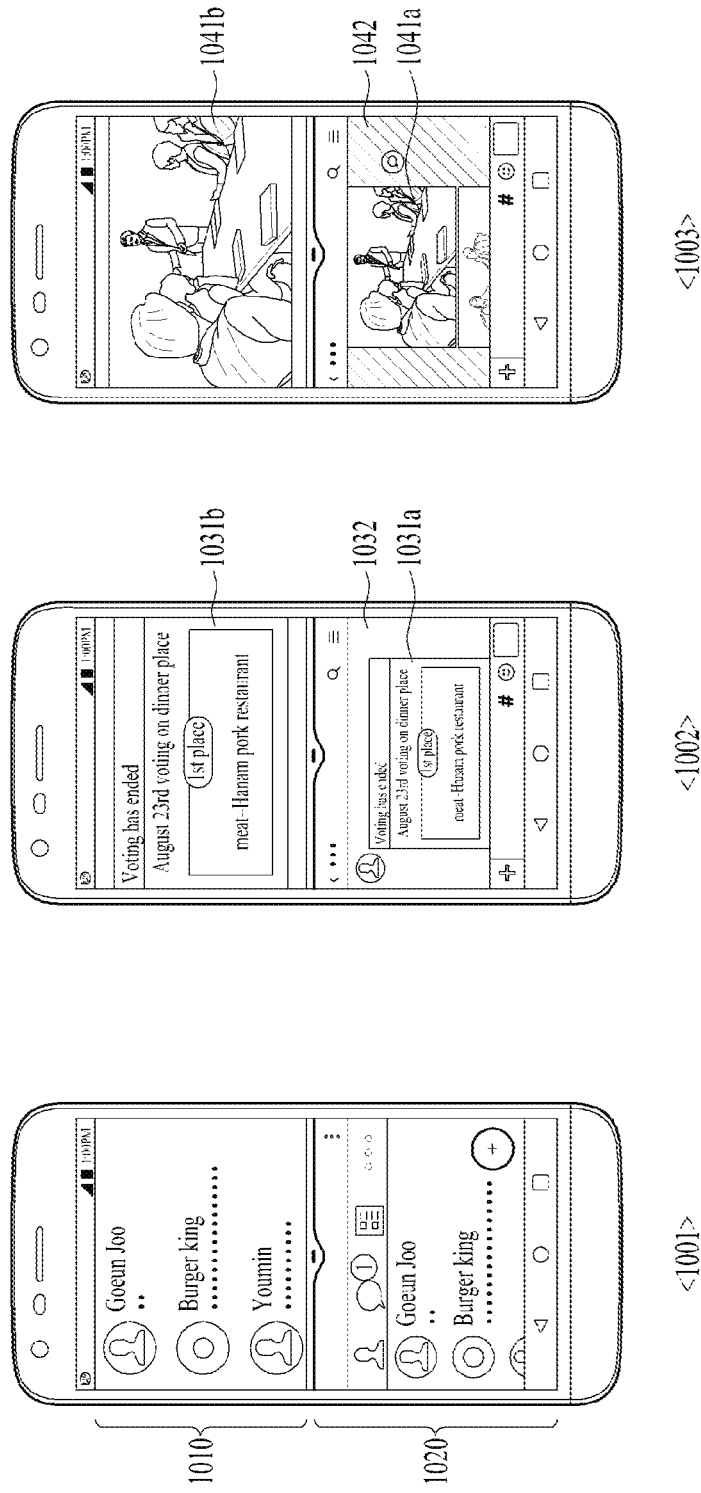
FIG. 10 is a diagram for a different example of entering one hand mode in the middle of executing an application in a mobile terminal according to one embodiment of the present invention.
Figure 11:
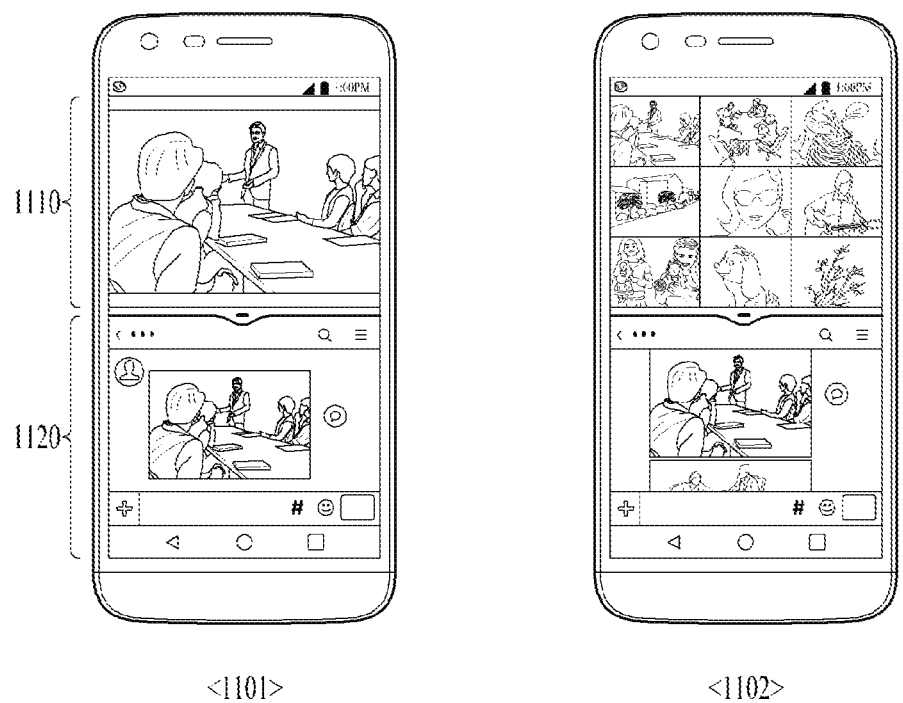
FIG. 11 is a diagram for a further different example of entering one hand mode in the middle of executing an application in a mobile terminal according to one embodiment of the present invention.

In embodiments of FIGS. 9 to 11, in case of entering one hand mode in the middle of executing an application, a method of outputting a view area and a control area is explained. In the embodiments of FIGS. 9 to 11, an execution screen of a message application is explained as an example. However, it is apparent that the method can also be applied to executions screens of various applications.

In relation to this, a state of outputting a keypad mentioned earlier in FIGS. 4 and 5 also corresponds to a state of executing an application. Hence, the embodiments of FIGS. 9 to 11 show cases that a keypad area is not outputted in the middle of executing an application.

FIG. 9 is a diagram for an example of entering one hand mode in the middle of executing an application in a mobile terminal according to one embodiment of the present invention. In the embodiment of FIG. 9, explanation on contents overlapped with the contents of FIG. 3 is omitted.

Referring to the first drawing of FIG. 9, an execution screen of a message application is outputted on the touch screen. In this case, unlike the embodiment of FIG. 4, the execution screen of the message application shown in FIG. 9 can include a floating icon for adding conversation information, conversation list, and a conversation window. In this case, the conversation information can include a menu for selecting a conversation list and a conversation partner. And, the conversation list corresponds to a list of messages transmitted and received by the mobile terminal.

In the execution screen of the message application, the conversation information corresponds to an area that conversation is actually shown to a user. The conversation information corresponds to a basic area where both view and control are available. For example, in case of entering one hand mode in the middle of executing a phone call application, a list of sending and receiving calls may corresponds to the basic area where both view and control are available. And, for example, in case of entering one hand mode in the middle of executing a gallery application, a plurality of thumbnail images may corresponds to the basic area where both view and control are available.

The mobile terminal can sense a first control input 931 inputted on the touch screen. In this case, the first control input 931 corresponds to an input identical to the control input mentioned earlier in FIG. 3. The first control input 931 can be sensed on a blank area of an execution screen of an application. For example, in the embodiment of FIG. 9, the blank area corresponds to an area where a text or an icon is not outputted.

Subsequently, the mobile terminal can switch to one hand mode from a normal mode in response to the first control input 931. In this case, referring to the second drawing of FIG. 9, the mobile terminal outputs a conversation list 910 on the view area and outputs conversation information 921 and, a floating icon 922, and a conversation list 923 on the control area. In this case, in order to increase visibility, the conversation list 910 outputted on the view area can be outputted in a manner of being magnified to minimize a space. In particular, it may be able to output a read-only area on the view area except a touchable area among an execution screen of the same application.

Meanwhile, referring to the third drawing of FIG. 9, the mobile terminal can sense a second control input 932 inputted on the conversation list 923 outputted on the control area. In this case, unlike the first control input 931, the second control input 932 corresponds to a touch and drag input of normal touch strength. In this case, the mobile terminal can scroll the conversation list 923 of the control area according to a moving distance of the second control input 932. Referring to the fourth drawing of FIG. 9, if the conversation list of the control area is scrolled, it may also be able to identically scroll the conversation list 910 outputted on the view area.

FIG. 10 is a diagram for a different example of entering one hand mode in the middle of executing an application in a mobile terminal according to one embodiment of the present invention.

More specifically, the embodiment of FIG. 10 shows contents outputted on the view area and the control area in case of entering one hand mode in the middle of executing a message application.

Referring to <1001>, as mentioned earlier in FIG. 9, it shows a case of entering one hand mode in a state that a conversation list of the message application is outputted. In this case, as mentioned earlier in FIG. 9, the conversation list is outputted only on the view area and an execution screen of the message application is outputted on the whole of the control area. In this case, in order to reduce a space and increase visibility, the conversation list outputted on the view area can be outputted in a manner of being magnified.

Referring to <1002>, it shows a case of entering one hand mode in a state that a conversation window is outputted in the message application. In particular, it shows a case of outputting a notice in the conversation window. In this case, conversation content is outputted only on the view area and the conversation window of the message application can be outputted on the whole of the control area. And, the notice 1031*b* is outputted on the view area in a manner of being magnified. In particular, a space layout 1032 of the control area is excluded and the notice 1031*b* is outputted only on the view area in a manner of being magnified. By doing so, it may be able to increase readability of a user for the notice.

Referring to <1003>, it shows a case of entering one hand mode in a state that a conversation window is outputted in the message application. In particular, it shows a case of outputting an image in the conversation window. In this case, conversation content is outputted only on the view area and the conversation window of the message application can be outputted on the whole of the control area. And, the image 1041*b* is outputted on the view area in a manner of being magnified. In particular, a space layout 1042 of the control area is excluded and the image 1041*b* is outputted only on the view area in a manner of being magnified. By doing so, although a separate control input for watching the image in detail is not inputted, a user can easily recognize the image.

FIG. 11 is a diagram for a further different example of entering one hand mode in the middle of executing an application in a mobile terminal according to one embodiment of the present invention.

More specifically, the embodiment of FIG. 11 shows a case of receiving or transmitting an image in the middle of executing a message application. In the embodiment of FIG. 11, explanation on contents overlapped with the contents of FIGS. 9 and 10 is omitted.

Referring to <1101>, if a single image is received or transmitted in a conversation window, the mobile terminal outputs the image on the control area 1120 and can output the single image on the view area 1110 in full view.

On the contrary, if a plurality of images are received or transmitted, it may be difficult for the mobile terminal to output each of a plurality of the images in full view. In this case, referring to <1102>, if a plurality of the images are received or transmitted in a conversation window, the mobile terminal can sequentially output the images on the control area 1120. Since it is able to sense a control input on the control area 1120, each of the images can be outputted in a manner of being scrolled according to a control input of a user. However, in case of the view area 1120, since it is impossible to sense a control input on the view area 1120, the mobile terminal can output a plurality of the images at the same time using thumbnail images instead of the full view.

Screen Configuration Automatically Executed on View Area

In the embodiments of FIGS. 3 to 11, a method of outputting contents on the view area and the control area of the touch screen has been explained in case that the mobile terminal switches to one hand mode from a normal mode. In embodiments of FIGS. 12 to 18, a method of automatically configuring and using contents outputted on the view area is explained in case of entering one hand mode.

In embodiments of FIGS. 12 to 16, a method of configuring and executing a screen automatically executed in a normal mode or one hand mode in the middle of executing a bank application is explained. In embodiment of FIG. 17, a method of configuring a screen automatically executed in one hand mode in an application requiring log in is explained. The bank application and the application requiring log in are exemplary only. It is apparent that the method can be applied to various applications as well as the applications.

Figure 12:
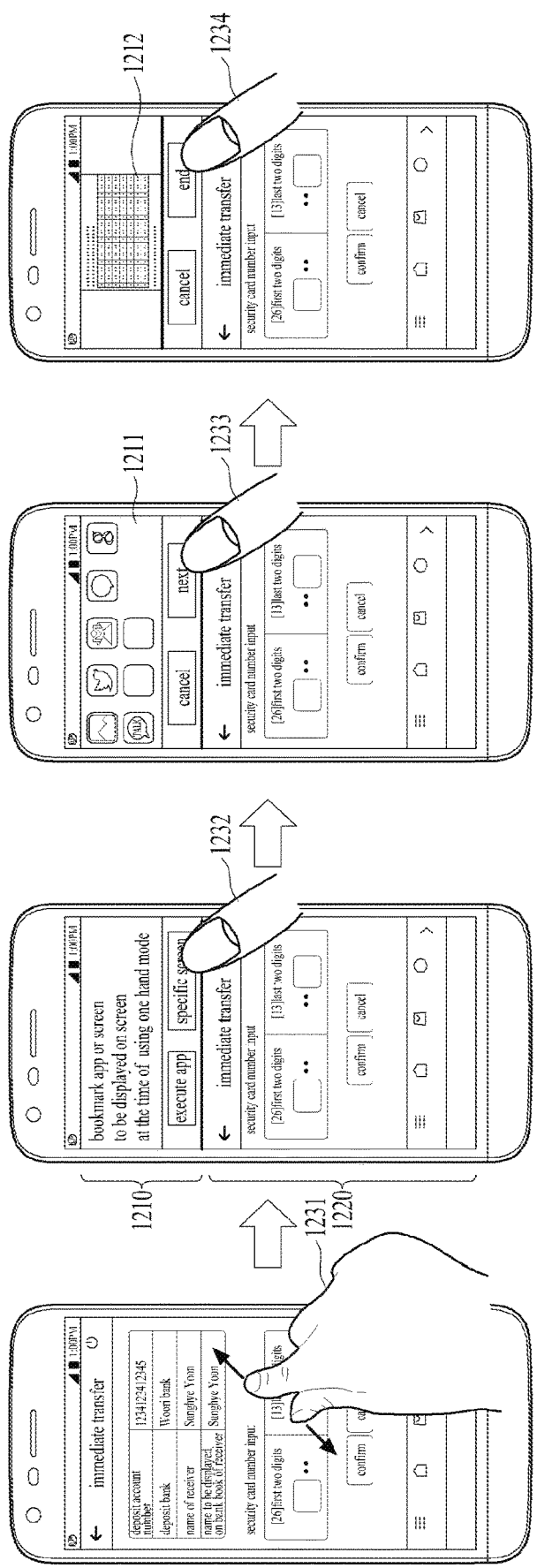
FIG. 12 is a diagram for an example of configuring an option automatically executed on in application in a mobile terminal according to one embodiment of the present invention.

FIG. 12 is a diagram for an example of configuring an option automatically executed in an application in a mobile terminal according to one embodiment of the present invention.

More specifically, FIG. 12 shows a method of configuring a screen automatically outputted on a specific area in a state that a bank application is executed.

Referring to the first drawing of FIG. 12, an execution screen of the bank application is outputted on the touch screen. In this case, the execution screen of the bank application corresponds to a transfer execution screen. In this case, the mobile terminal can sense a first control input 1231 inputted on the touch screen. In this case, the first control input 1231 corresponds to an input for configuring a screen to be used in one hand operating mode and may correspond to a pinch-out touch input. And, the first control input 1231 can include various touch inputs except the pinch-out touch input. In this case, since the press touch and drag input mentioned earlier in FIG. 3 corresponds to an input for entering one hand mode, the press touch and drag input can be excluded from the first control input 1231.

In this case, the mobile terminal can provide an automatic screen configuration interface. Referring to the second drawing of FIG. 12, the mobile terminal can output a guide message of the automatic screen configuration interface on a first area 1210 of the touch screen. In this case, the first area 1210 corresponds to an upper part of the touch screen or a view area 1210 in one hand mode. In this case, the guide message corresponds to a guide message for selecting an option for executing an application or an option for outputting a specific image using an automatic screen in one hand mode.

The mobile terminal can sense a second control input 1232 for outputting a specific image. In this case, the second control input 1232 can be sensed on a second area 1220. In this case, the second area 1220 corresponds to a bottom part of the touch screen or a control area 1220 in one hand mode. In this case, as shown in the third drawing of FIG. 12, the mobile terminal can output an upper category of a specific screen on the first area 1210. For example, the upper category 1211 of the specific screen can include a gallery application, a video application such as YouTube, a message application, and the like.

In a state that a gallery application is selected from the upper category 1211, the mobile terminal can sense a third control input 1233. In this case, the third control input 1233 can be sensed on the second area 1220. In this case, although it is not depicted in FIG. 12, the mobile terminal can output thumbnails of a plurality of images included in the gallery application. And, the mobile terminal can sense a control input (not depicted) that selects an image from among a plurality of the images.

In this case, as shown in the fourth drawing of FIG. 12, the mobile terminal can output a selected image 1212 on the first area 1210. In the embodiment of FIG. 12, the selected image 1212 may correspond to an image of a bank security card. The mobile terminal can sense a fourth control input 1234 for configuring the selected image 1212 as an automatically outputted screen. The mobile terminal can complete configuration of the automatically outputted screen of the banking application in response to the fourth control input 1234.

Meanwhile, in the embodiment of FIG. 12, although it is depicted as the second to the fourth control inputs are sensed on the second area 1220, since it is configured in the normal mode, the control inputs can also be sensed on the first area 1210. And, in the embodiment of FIG. 12, although it is depicted as the automatic screen configuration is provided in one hand mode when a pinch-out touch input is sensed in the normal mode, the operation can be identically performed when a pinch-out touch input is sensed in one hand mode.

And, although it is not depicted in FIG. 12, if a pinch-in touch input inputted on the touch screen is sensed in a state that the automatic screen configuration interface is outputted, the automatic screen configuration interface can be terminated.

Figure 13:
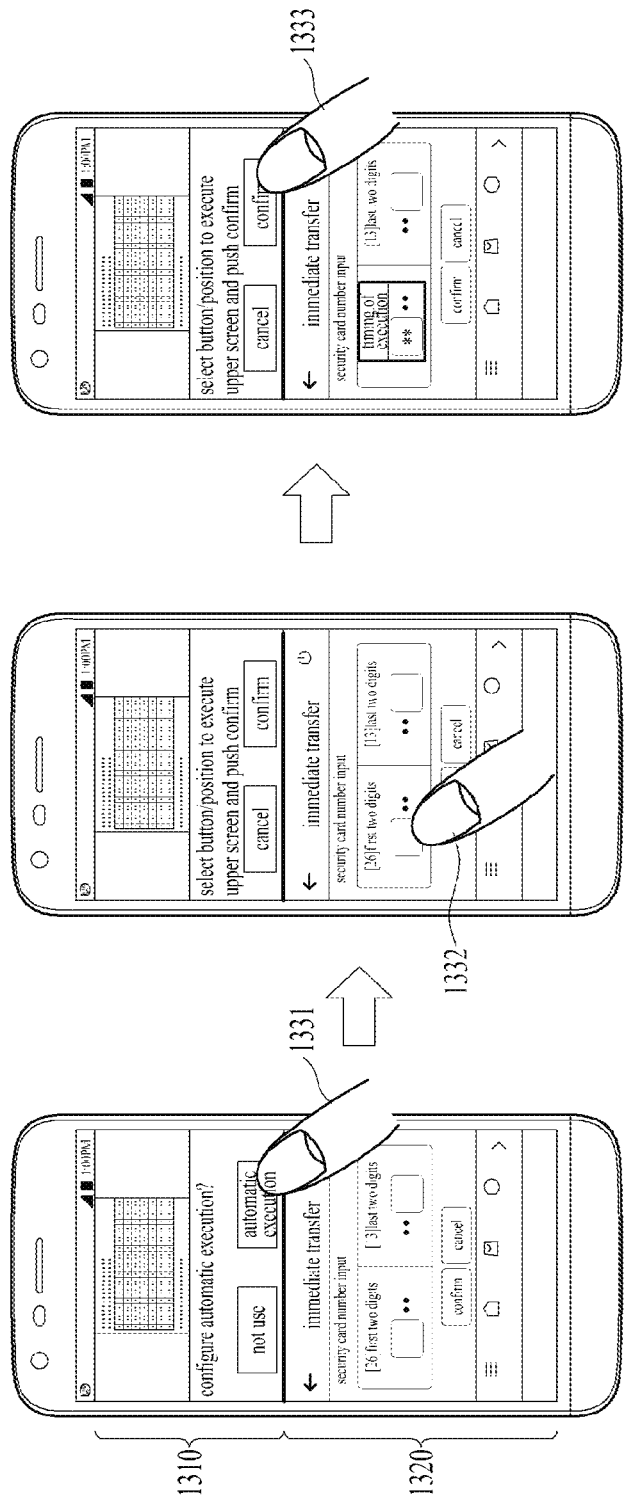
FIG. 13 is a diagram for a different example of configuring an option automatically executed in an application in a mobile terminal according to one embodiment of the present invention.
Figure 14:
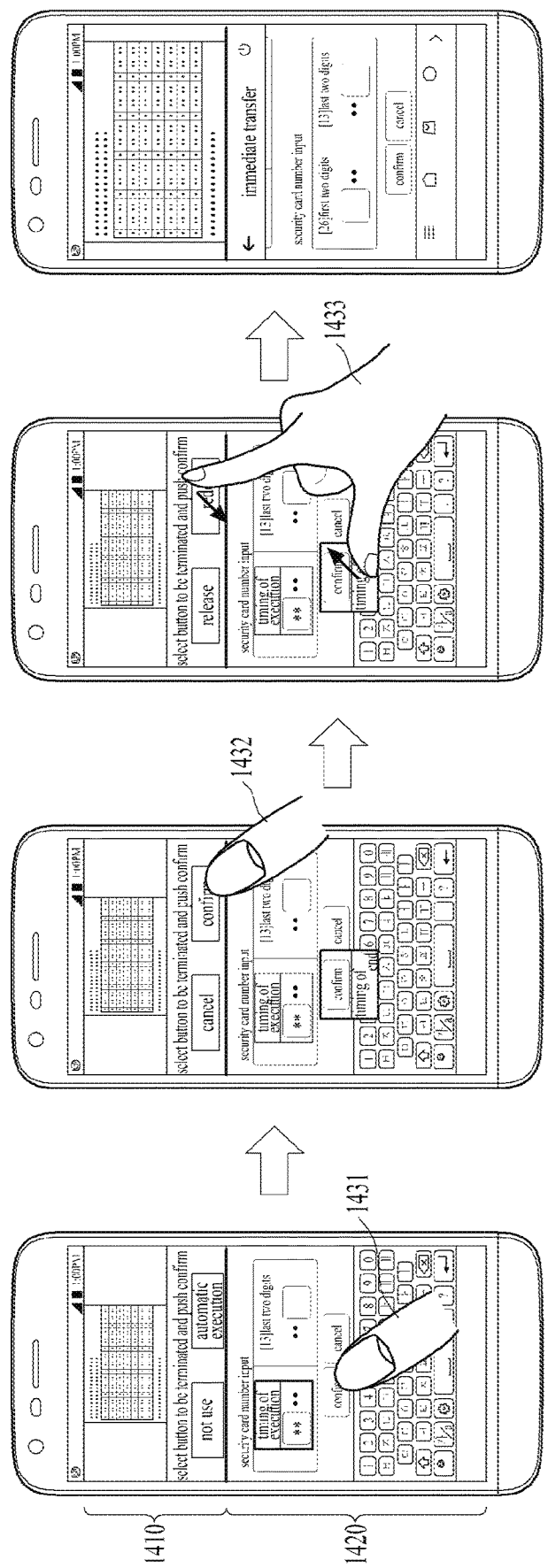
FIG. 14 is a diagram for a further different example of configuring an option automatically executed in an application in a mobile terminal according to one embodiment of the present invention.

FIGS. 13 and 14 are diagrams for a different example of configuring an option automatically executed in an application in a mobile terminal according to one embodiment of the present invention.

More specifically, FIGS. 13 and 14 show a method of configuring automatic execution and ending timing of a screen automatically outputted on a view area in a state that a bank application is executed. Although it is able to configure the automatically outputted screen to be continuously outputted in the state that the bank application is executed, the automatic execution and the ending timing of the screen can be configured as follows according to an additional configuration of a user.

In the embodiments of FIGS. 13 and 14, assume that the mobile terminal is in a normal mode rather than one hand mode. The embodiments of FIGS. 13 and 14 can be performed right after the embodiment of FIG. 12.

Referring the first drawing of FIG. 13, a bank security card corresponding to an automatic screen is outputted on a first area 1310 and an execution screen of a bank application and a configuration message are outputted on a second area 1320 of the touch screen. The mobile terminal can sense a first control input 1331 for performing automatic execution configuration inputted on the second area 1320 in a state that an image of the bank security card is outputted on the first area 1310 of the touch screen. In this case, the first area 1310 may correspond to a top part of the touch screen or a view area in one hand mode. And, the second area 1320 corresponds to a bottom part of the touch screen or a control area in one hand mode.

Referring to the second drawing of FIG. 13, the mobile terminal can output such a message as 'select button/position to execute top screen'. And, the mobile terminal can sense a second control input 1332 inputted on a security card number input area among the execution screen of the bank application. And, referring to the third drawing of FIG. 13, the mobile terminal can sense a third control input inputted on 'confirm' among configuration messages right after the second control input 1332. In this case, the mobile terminal can configure the security number input area as timing of starting automatic execution in response to the second control input 1332 and the third control input 1333.

Subsequently, referring to the first drawing of FIG. 14, the mobile terminal can output such a message as 'select button to be terminated and push confirm'. The mobile terminal can sense a fourth control input 1431 inputted on a 'confirm' of the security number input area among the execution screen of the bank application. Referring to the second drawing of FIG. 14, the mobile terminal can sense a fifth control input 1432 inputted on 'confirm' among configuration messages right after the fourth control input 1431. In this case, the mobile terminal can configure the 'confirm' of the security number input area as timing of ending automatic execution in response to the fourth control input 1431 and the fifth control input 1432.

Referring to the third drawing of FIG. 14, after the configuration of the automatic execution timing is completed, the mobile terminal can sense a sixth control input 1433 inputted on the touch screen. In this case, the sixth control input 1433 corresponds to a pinch-out touch input. In this case, as shown in the fourth drawing of FIG. 14, the mobile terminal can stop providing the automatic screen configuration interface.

Figure 15:
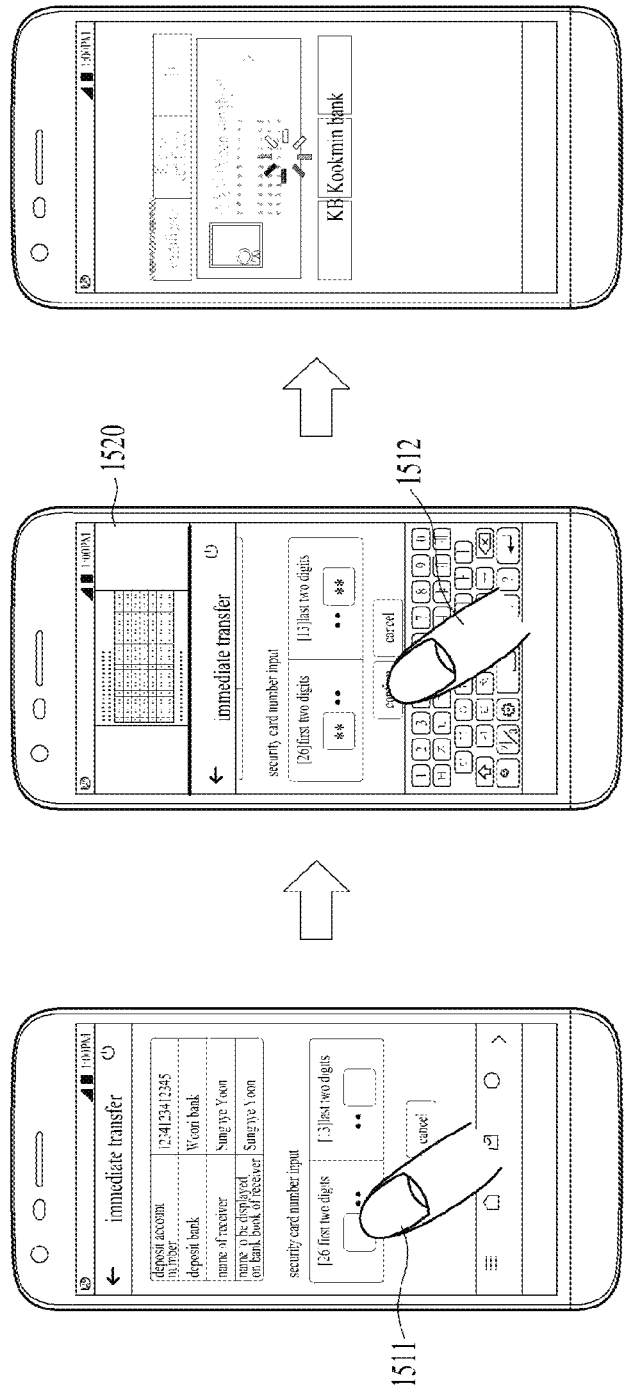
FIG. 15 is a diagram for an example of executing an option automatically executed in an application of a mobile terminal according to one embodiment of the present invention.

FIG. 15 is a diagram for an example of executing an option automatically executed in an application of a mobile terminal according to one embodiment of the present invention.

More specifically, the embodiment of FIG. 15 shows a case of actually using automatic execution in a state that the automatic configuration screen and the automatic execution timing are configured in FIGS. 12 to 14. In the embodiment of FIG. 15, assume that the mobile terminal is in a normal mode.

First of all, referring to the first drawing of FIG. 15, an execution screen of a bank application is outputted on the touch screen. The mobile terminal can sense a first control input 1511 inputted on a security number input area.

In this case, as shown in the second drawing of FIG. 15, the mobile terminal can output a security card image 1520 at the top of the touch screen. This is because the automatic execution start timing is configured by timing of sensing the control input inputted on the security number input area in the embodiments of FIGS. 13 and 14. By doing so, a user can input a security card number while immediately checking the security card image 1520 outputted at the top of the touch screen. After the input of the security card number is completed, the mobile terminal can sense a second control input 1512 inputted on 'confirm' of the security card number input area.

In this case, as shown in the third drawing of FIG. 15, the mobile terminal eliminates the security card image 1520 outputted at the top of the touch screen and can perform transfer. This is because the automatic execution ending timing is configured by timing of sensing the control input inputted on the 'confirm' of the security card number input area in the embodiments of FIGS. 13 and 14.

By doing so, a user can avoid inconvenience of executing a different application by multitasking to check a security card number stored in a separate application in the middle of executing the band application.

Figure 16:
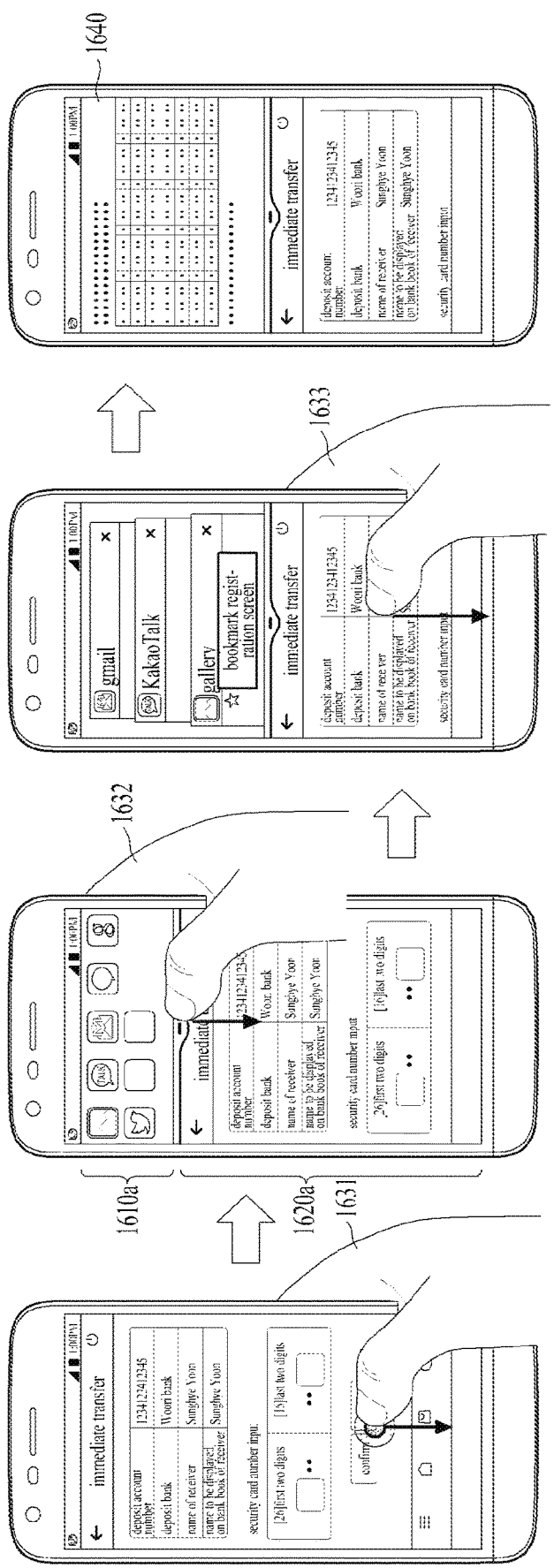
FIG. 16 is a diagram for an example of configuring an option automatically executed in one hand mode of a mobile terminal according to one embodiment of the present invention.

FIG. 16 is a diagram for an example of configuring an option automatically executed in one hand mode of a mobile terminal according to one embodiment of the present invention.

More specifically, FIG. 16 shows a method of configuring a screen automatically outputted on a view area in a state that a bank application is executed. In FIG. 16, explanation on contents overlapped with the contents of FIG. 12 is omitted.

Referring to the first drawing of FIG. 16, an execution screen of a bank application is outputted on the touch screen. The mobile terminal can sense a first control input 1631 inputted on the touch screen. In this case, the first control input corresponds to the control input mentioned earlier in FIG. 3. And, the first control input corresponds to an input for switching the mobile terminal to one hand mode from a normal mode.

In this case, as shown in the second drawing of FIG. 16, the mobile terminal can output a view area 1610 and a control area 1620 on the touch screen. In this case, a form outputted on the view area may change based on a size of the view area 1610. Referring to the second drawing of FIG. 16, if a size of the view area 1610a is smaller than a half of the touch screen, the mobile terminal can output an automatic configuration list in the form of icons. In this case, a screen outputted on the control area 1620 may correspond to a screen that the execution screen of the bank application has moved to the bottom as much as the size of the view area 1610.

The mobile terminal can output a division indicator to inform a user of a mode of the mobile terminal switched to one hand mode and control sizes of the view area and the control area. Referring to the second drawing of FIG. 16, the mobile terminal can sense a second control input 1632 inputted on the division indicator. In this case, unlike the first control input 1631, the second control input 1632 corresponds to a touch and drag input of normal touch strength. And, a position at which the second control input 1632 is sensed can include the division indicator and an area adjacent to the division indicator. In this case, the mobile terminal can control the sizes of the view area and the control area according to a moving distance of the second control input 1632.

If the size of the view area belongs to a range of a prescribed size according to the second control input 1632, the mobile terminal can output an automatic configuration list on the view area 1610a in the form of windows. In this case, an item shown at the top among the automatic configuration list may correspond to a bookmark registration screen. In particular, if the size of the view area increases, the mobile terminal shows a part of actual screens of the items included in the automatic configuration list to make a user easily recognize the items. In this case, the prescribed size corresponds to a half of the touch screen size, by which the present invention may be non-limited. In this case, the screen outputted on the control area 1620 may correspond to a screen that the execution screen of the bank application has moved to the bottom as much as the size of the view area 1610b.

Meanwhile, the mobile terminal can sense a third control input 1633 inputted on the control area 1620. In this case, the third control input 1633 may correspond to a touch and drag input identical to the second control input 1632. And, the third control input 1633 corresponds to a touch and drag input in down direction and can be released at a bezel area of the bottom of the touch screen. Meanwhile, the third control input 1633 may correspond to a press touch and drag input in down direction and can be released at the bezel area of the bottom of the touch screen.

In this case, referring to the fourth drawing of FIG. 16, the mobile terminal can control a bookmark registration screen 1640 positioned at the top of the automatic configuration list to be outputted on the view area in response to the third control input 1633. In this case, the bookmark registration screen 1640 may correspond to a screen registered by the procedure mentioned earlier in FIG. 12.

And, although it is not depicted in the embodiment of FIG. 16, in the third drawing of FIG. 16, if a press touch input rather than the third control input 1633 is sensed, as mentioned earlier in the embodiment of FIG. 7, the mobile terminal can output an automatic configuration list pop-up on the control area. In this case, a user can select one of recently used lists besides the bookmark registration screen by scrolling the automatic configuration list pop-up.

According to the embodiments of FIGS. 9 to 11, if a first control input is sensed in a state that an execution screen of an application is outputted, the mobile terminal enters one hand mode and an area except an editing area is outputted on the view area. However, as shown in FIG. 16, the mobile terminal may output a configuration interface on the view area after entering the one hand mode depending on a user configuration or a configuration of the mobile terminal.

Figure 17:
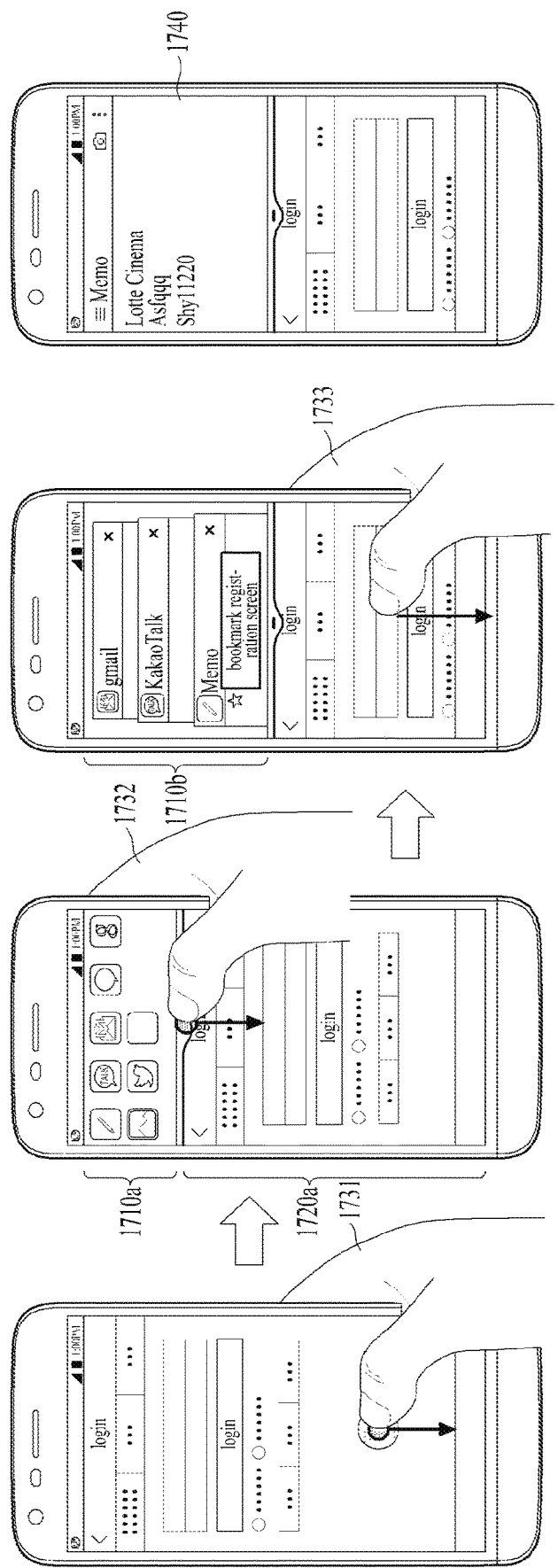
FIG. 17 is a diagram for a different example of configuring an option automatically executed in one hand mode of a mobile terminal according to one embodiment of the present invention.

FIG. 17 is a diagram for a different example of configuring an option automatically executed in one hand mode of a mobile terminal according to one embodiment of the present invention.

More specifically, FIG. 17 shows a method of configuring a screen automatically outputted on a view area in a state that an application requiring login is executed. In the embodiment of FIG. 17, explanation on contents overlapped with the contents of FIG. 16 is omitted.

Referring to the first drawing of FIG. 17, a login screen of an application is outputted on the touch screen. The mobile terminal can sense a first control input 1731 inputted on the touch screen. In this case, the first control input corresponds to the control input mentioned earlier in FIG. 3. And, the first control input 1731 corresponds to an input for switching the mobile terminal to one hand mode from a normal mode.

In this case, as shown in the second drawing of FIG. 17, the mobile terminal can output a view area 1710 and a control area 1720 on the touch screen. In this case, a form outputted on the view area may change based on a size of the view area 1710. Referring to the second drawing of FIG. 17, if the size of the view area 1710*a* is smaller than a half of the touch screen size (e.g., ⅓), the mobile terminal can output an automatic configuration list in the form of icons. In this case, a screen outputted on the control area 1720 corresponds to a screen that the login screen has moved to the bottom as much as the size of the view area 1710*a*.

The mobile terminal can output a division indicator to inform a user of a mode of the mobile terminal switched to one hand mode and control sizes of the view area and the control area. Referring to the second drawing of FIG. 17, the mobile terminal can sense a second control input 1732 inputted on the division indicator. In this case, the second control input 1632 is identical to the second control input mentioned earlier in FIG. 16. In this case, the mobile terminal can control the sizes of the view area and the control area according to a moving distance of the second control input 1732.

If the size of the view area belongs to a range of a prescribed size according to the second control input 1732, the mobile terminal can output an automatic configuration list on the view area 1710*a* in a manner of vertically listing the automatic configuration list in the form of windows. In this case, an item shown at the top among the automatic configuration list may correspond to a bookmark registration screen. In this case, the bookmark registration screen can be registered via the procedure mentioned earlier in FIG. 12. And, the screen outputted on the control area 1720 may correspond to a screen that the login screen has moved to the bottom as much as the size of the view area 1710*b*.

Meanwhile, the mobile terminal can sense a third control input 1733 inputted on the control area 1720. In this case, the third control input 1733 is identical to the third control input mentioned earlier in FIG. 16. In this case, referring to the fourth drawing of FIG. 17, the mobile terminal can control the bookmark registration screen 1740 located at the top among the automatic configuration list to be outputted on the view area.

Depth Switching on One Screen

Figure 18:
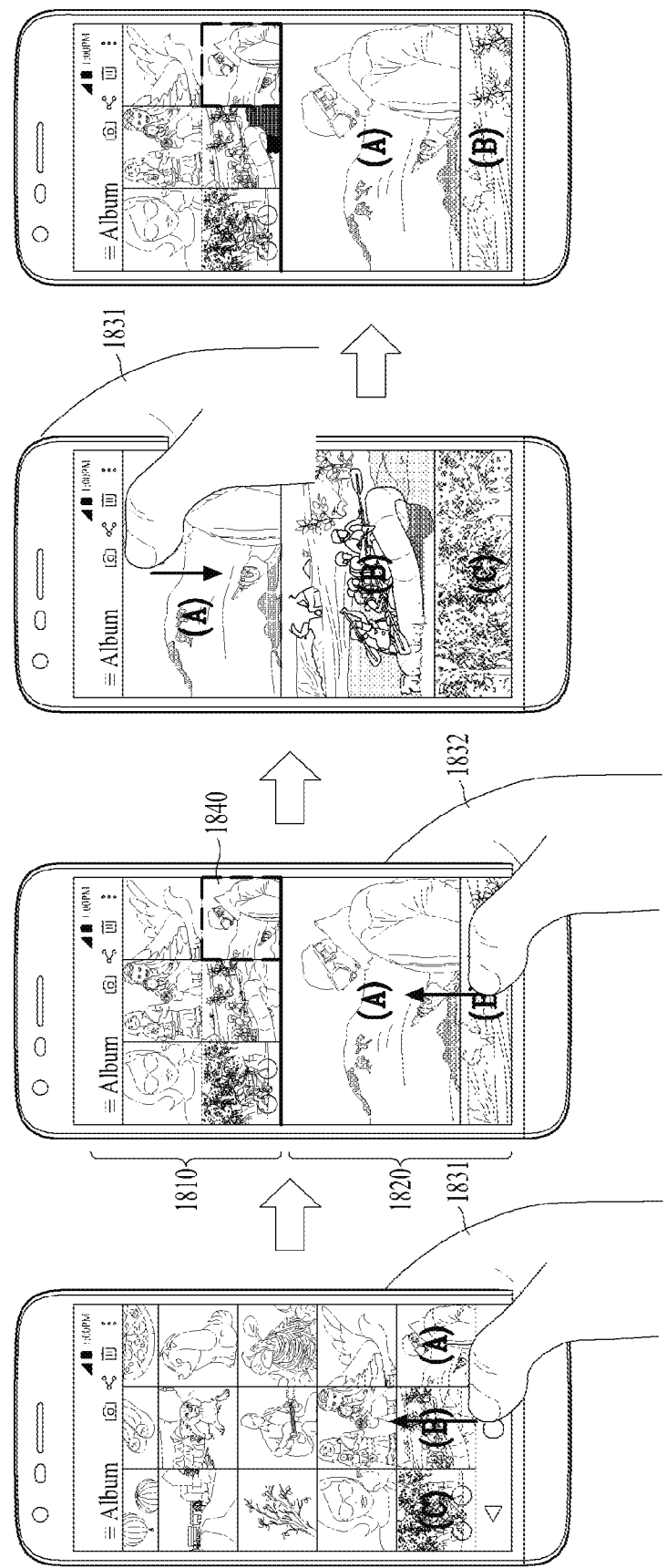
FIG. 18 is a diagram for an example of switching a depth on a screen of a mobile terminal according to one embodiment of the present invention.

FIG. 18 is a diagram for an example of switching a depth on a screen of a mobile terminal according to one embodiment of the present invention.

More specifically, FIG. 18 shows a moving method in a gallery application without switching among a plurality of depths. In the embodiment of FIG. 18, a gallery application is explained as an example. However, it is apparent that the method can be applied to any application including a plurality of depths.

In the present invention, a depth has a meaning indicating higher and lower structures. If a lower category item is included in a higher category item, the higher category item corresponds to a first depth and the lower category item corresponds to a second depth. Yet, the first depth and the second depth may correspond to either the higher category or the lower category depending on a configuration. In the present embodiment, assume that the lower category and the higher category correspond to the first depth and the second depth, respectively.

Referring to the first drawing of FIG. 18, it may be able to output a plurality of thumbnail images corresponding to a first depth of a gallery application on the touch screen. In this case, (A), (B), and (C) thumbnails outputted at the bottom of a plurality of the thumbnail images may correspond to images located at the end of the gallery application.

The mobile terminal can sense a first control input 1831 inputted on an area at which the (A), (B), and (C) thumbnails are located. In this case, the first control input 1831 corresponds to a drag touch or flicking touch in up direction. In particular, the first control input 1831 corresponds to an input for checking thumbnails located after the (A), (b), and (C) thumbnails via scrolling.

In this case, since the (A), (b), and (C) thumbnails are located at the end, the mobile terminal can output an image corresponding to a second depth on the touch screen in response to the first control input 1831. More specifically, as shown in the second drawing of FIG. 18, the mobile terminal can output the touch screen by dividing the touch screen into a first area 1810 and a second area 1820. The mobile terminal can output a plurality of thumbnail images corresponding to the first depth on the first area 1810 and can continuously output images corresponding to the second depth on the second area 1820. In this case, an image outputted at the top of the second area 1820 may correspond to a magnified image of the (A) thumbnail corresponding to the last image among a plurality of the thumbnails. In order to indicate that the magnified image of the (A) thumbnail is outputted, the mobile terminal can highlight the edge of the (A) thumbnail outputted on the first area 1810

And, the mobile terminal can sense a second control input 1832 inputted on the second area 1820. In this case, the second control input corresponds to a drag touch or a flicking touch in up direction.

In this case, as shown in the third drawing of FIG. 18, the mobile terminal can continuously output a magnified image corresponding to the second depth. In particular, the mobile terminal can sequentially output a detail view of a plurality of thumbnail images in response to the second control input 1832. In particular, the mobile terminal can sequentially output a detail view of a plurality of thumbnail images from a detail view of the (A) thumbnail image corresponding to the last image.

Meanwhile, the mobile terminal can sense a third control input 1833 in a state that the detail view of the (A) thumbnail image is outputted. In this case, the third control input 1833 corresponds to a drag touch or a flicking touch in down direction.

In this case, since the detail view of the (A) thumbnail image is located at the end, it is impossible to additionally scroll the detail view of the (A) thumbnail image in response to the third control input 1833. Hence, referring to the fourth drawing of FIG. 18, similar to the second drawing of FIG. 18, the mobile terminal can divide the touch screen into the first area 1810 and the second area 1820 again in response to the third control input 1833. The mobile terminal outputs a plurality of thumbnail images corresponding to the first depth on the first area 1810 and can sequentially output images corresponding to the second depth on the second area 1820.

In particular, according to the present embodiment, a user can easily move between depths in an application including a plurality of depths using a scroll operation only.

FIG. 19 is a flowchart for a method of controlling a mobile terminal according to one embodiment of the present invention.

First of all, a mobile terminal can sense a first control input inputted on a touch screen [S1910]. In this case, as mentioned earlier in FIG. 3, the first control input may correspond to a press touch and drag input in one direction.

Subsequently, the mobile terminal can enter one hand mode that divides the touch screen into a view area and a control area in response to the first control input [S1920]. As mentioned earlier in FIG. 3, the view area corresponds to an area at which a control input is not sensed and the control area corresponds to an area at which a control input is sensed.

In this case, the mobile terminal can determine whether or not a home screen, a keypad area, or an execution screen of an application is outputted on the touch screen at the time of sensing the first control input [S1930]. In this case, a case of outputting the keypad area also corresponds to one of states of outputting an execution screen of an application. In particular, if an execution screen of an application is outputted, it indicates a case that a keypad area is not outputted in a state that the execution screen of the application is outputted.

In the step S1930, when the first control input is sensed, if the keypad area is outputted on the touch screen, the mobile terminal can change the keypad outputted on the control area with a simple keypad. In relation to this, as mentioned earlier in FIGS. 4 and 5, the mobile terminal can control the view area via a control input inputted on the control area.

In the step S1930, when the first control input is sensed, if a home screen is outputted on the touch screen, the mobile terminal outputs a recently used list on the view area and can output the home screen on the control area [S1950]. In relation to this, as mentioned earlier in FIG. 6, the mobile terminal can output the recently used list on the view area in the form of icons or windows depending on a size of the view area.

In the step S1930, when the first control input is sensed, if an execution screen of an application is outputted on the touch screen, the mobile terminal can output an area capable of sensing a control input among the execution screen of the application in a manner of moving the area to the control area [S1960]. In relation to this, as mentioned earlier in FIGS. 9 to 11, the mobile terminal can display a normal area except an editing area capable of sensing a control input among the execution screen of the application on the view area and the control area at the same time.

Moreover, for clarity, although each drawing is explained in a manner of being divided, embodiments described for each drawing can be combined with each other to implement a new embodiment.

According to at least one embodiment of the present invention, it is able to utilize the whole of the touch screen not only in a normal mode but also in one hand mode.

According to at least one embodiment of the present invention, it is able to control a view area beyond the reach of a hand of a user in a control area in one hand mode.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a touchscreen; and
a controller configured to:
operate in a first mode during which the touchscreen displays a default text keypad and a view area combined with a control area, wherein a specific message content and a message counterpart information are displayed together with the default text keypad including alphabetic keys and numeric keys during the first mode, and wherein the specific message content is displayed between the message counterpart information and the default text keypad during the first mode;
in response to a first input received at the touchscreen, switch from the first mode to a second mode and cause the touchscreen to display a simple text keypad including alphabetic keys without numeric keys, instead of the default text keypad, in the control area together with an enlarged version of the specific message content in the view area during the second mode such that the default text keypad is no longer displayed during the second mode,
wherein during the second mode the view area is separate from the control area,
wherein the message counterpart information is displayed between the enlarged version of the specific message content and the simple text keypad during the second mode; and
wherein the message counterpart information includes information identifying a conversation partner.

2. The mobile terminal of claim 1, wherein the controller is further configured to:
cause the touchscreen to display a pop-up window in the control area during the second mode in response to a second input received at the control area during the second mode.

3. The mobile terminal of claim 2, wherein the controller is further configured to:
cause the touchscreen to stop the displaying of the pop-up window if an input is not received after a defined period of time.

4. The mobile terminal of claim 1, wherein the controller is further configured to:
cause the touchscreen to display a conversation information area of a message application in the control area during the second mode.

5. The mobile terminal of claim 1, wherein the controller is further configured to:
cause the touchscreen to display a home screen during the first mode, and cause the touchscreen to display the home screen in the control area and a list of recently used applications in the view area during the second mode.

6. The mobile terminal of claim 5, wherein the controller is further configured to:
cause the touchscreen to display an execution screen of a most recently used application among the list of recently used applications, when a second input is received at the control area while in the second mode, wherein the second input includes a touch and drag input released at a bezel of the touchscreen.

7. The mobile terminal of claim 1, wherein the controller is further configured to:
cause the touchscreen to display an editing area of an execution screen of an application in the control area, when the mobile terminal switches to the second mode and the execution screen of the application was displayed on the touchscreen during the first mode.

8. The mobile terminal of claim 7, wherein the controller is further configured to:
cause the touchscreen to display a normal area, except the editing area, on the view area during the second mode; and
cause the touchscreen to display a magnified view of the normal area in the view area during the second mode.

9. The mobile terminal of claim 8, wherein the controller is further configured to:
control the normal area in the control area and the normal area in view area, during the second mode, both in response to a second input received at the normal area in the control area.

10. The mobile terminal of claim 1, wherein the first input is a touch and drag input in one direction.

11. The mobile terminal of claim 10, wherein the controller is further configured to:
switch from the second mode to the first mode in response to receiving of a second input comprising a touch and drag input in a direction that is different than the one direction of the first input.

12. The mobile terminal of claim 1, wherein the view area is an area at which a control input is not sensed and the control area is an area at which a control input is sensed.

13. The mobile terminal of claim 1, wherein the first input is sensed on a blank area of the touchscreen.

14. The mobile terminal of claim 1, wherein the controller is further configured to:
cause the touchscreen to display a division indicator between the view area and the control area after switching from the first mode to the second mode.

15. The mobile terminal of claim 1, further comprising a wireless communication unit, wherein the controller is further configured to:

cause the touchscreen to display a notification of receiving of an event via the wireless communication unit, wherein the notification is displayed at a top portion of the touchscreen; and
move the view area and the control area to permit the displaying of the notification.

16. The mobile terminal of claim 1, wherein the first mode is a normal mode and the second mode is a single-hand mode.

17. A method of controlling a mobile terminal having a touchscreen, the method comprising:
operating the mobile terminal in a first mode during which the touchscreen displays a default text keypad and a view area combined with a control area, wherein a specific message content and a message counterpart information are displayed together with the default text keypad including alphabetic keys and numeric keys during the first mode, and wherein the specific message content is displayed between the message counterpart information and the default text keypad during the first mode;
in response to a first input received at the touchscreen, switching from the first mode to a second mode and displaying on the touchscreen a simple text keypad including alphabetic keys without numeric keys, instead of the default text keypad, in the control area together with an enlarged version of the specific message content in the view area during the second mode such that the default text keypad is no longer displayed during the second mode,
wherein during the second mode the view area is separate from the control area,
wherein the message counterpart information is displayed between the enlarged version of the specific message content and the simple text keypad during the second mode, and
wherein the message counterpart information includes information identifying a conversation partner.

18. The method of claim 17, further comprising:
displaying, on the touchscreen, a home screen during the first mode, and
displaying the home screen in the control area and a list of recently used applications in the view area during the second mode.

19. The method of claim 17, further comprising:
displaying, on the touchscreen, an editing area of an execution screen of an application on the control area, when the mobile terminal switches to the second mode and the execution screen of the application was displayed on the touchscreen during the first mode.

* * * * *